(12) United States Patent
Kakaire

(10) Patent No.: US 11,755,197 B1
(45) Date of Patent: Sep. 12, 2023

(54) MOVE TOOL SYSTEM

(71) Applicant: James Kirunda Kakaire, Silver Spring, MD (US)

(72) Inventor: James Kirunda Kakaire, Silver Spring, MD (US)

(73) Assignee: PROZINDU, LLC, Silver Spring, MD (US)

(*) Notice: Subject to any disclaimer, the term of this patent is extended or adjusted under 35 U.S.C. 154(b) by 0 days.

(21) Appl. No.: 16/233,050

(22) Filed: Dec. 26, 2018

Related U.S. Application Data

(60) Provisional application No. 62/610,577, filed on Dec. 27, 2017.

(51) Int. Cl.
*G06F 3/04886* (2022.01)
*G06F 3/0482* (2013.01)
*G06Q 10/10* (2023.01)
*G06Q 10/0631* (2023.01)

(52) U.S. Cl.
CPC .......... *G06F 3/04886* (2013.01); *G06F 3/0482* (2013.01); *G06Q 10/063114* (2013.01); *G06Q 10/103* (2013.01)

(58) Field of Classification Search
CPC ..... G06Q 10/06; G06Q 10/103; G06Q 10/109; Y02T 10/146; G06F 3/04886; G06F 3/0482; G06Q 10/063114
USPC ........................................................ 715/773
See application file for complete search history.

(56) References Cited

U.S. PATENT DOCUMENTS

| | | | | |
|---|---|---|---|---|
| 7,487,111 B2* | 2/2009 | Shoen et al. | ........... | G06Q 10/02 705/26.81 |
| 8,700,537 B1* | 4/2014 | Deshpande et al. | | G06Q 10/0834 705/1.1 |
| 9,934,546 B1* | 4/2018 | Deshpande et al. | | G06Q 30/0611 |
| 2001/0037230 A1* | 11/2001 | Raveis, Jr. et al. | | G06Q 10/1097 705/7.21 |
| 2003/0097273 A1* | 5/2003 | Carpenter, Jr. et al. | | G06Q 10/06 705/301 |
| 2003/0167193 A1* | 9/2003 | Jones et al. | ............... | G07C 1/10 705/32 |
| 2008/0059267 A1* | 3/2008 | Hamilton et al. | ...... | G06Q 10/00 705/7.15 |
| 2008/0183483 A1* | 7/2008 | Hart | ...................... | G06F 30/13 705/1.1 |
| 2009/0259565 A1* | 10/2009 | Avisror et al. | ..... | G06Q 30/0601 705/13 |
| 2010/0312605 A1* | 12/2010 | Mitchell et al. | ....... | G06Q 10/06 705/7.13 |

(Continued)

*Primary Examiner* — Sheree N Brown

(57) ABSTRACT

A system for streamlining commercial moving services by providing real time data entry and communication processes. It utilizes data driven interfaces that generates buttons based on data. The system prevents data entry errors by providing touch buttons that limits typing of required information. Data is loaded in the button links at runtime. The messaging module generates a project communication team where members of the team are extracted from scheduled workers and company employees working on the project. The system prioritizes offices to be backfilled and displays completed and uncompleted tasks conserving time.

20 Claims, 23 Drawing Sheets

Client Main User Interface

Figure 1:
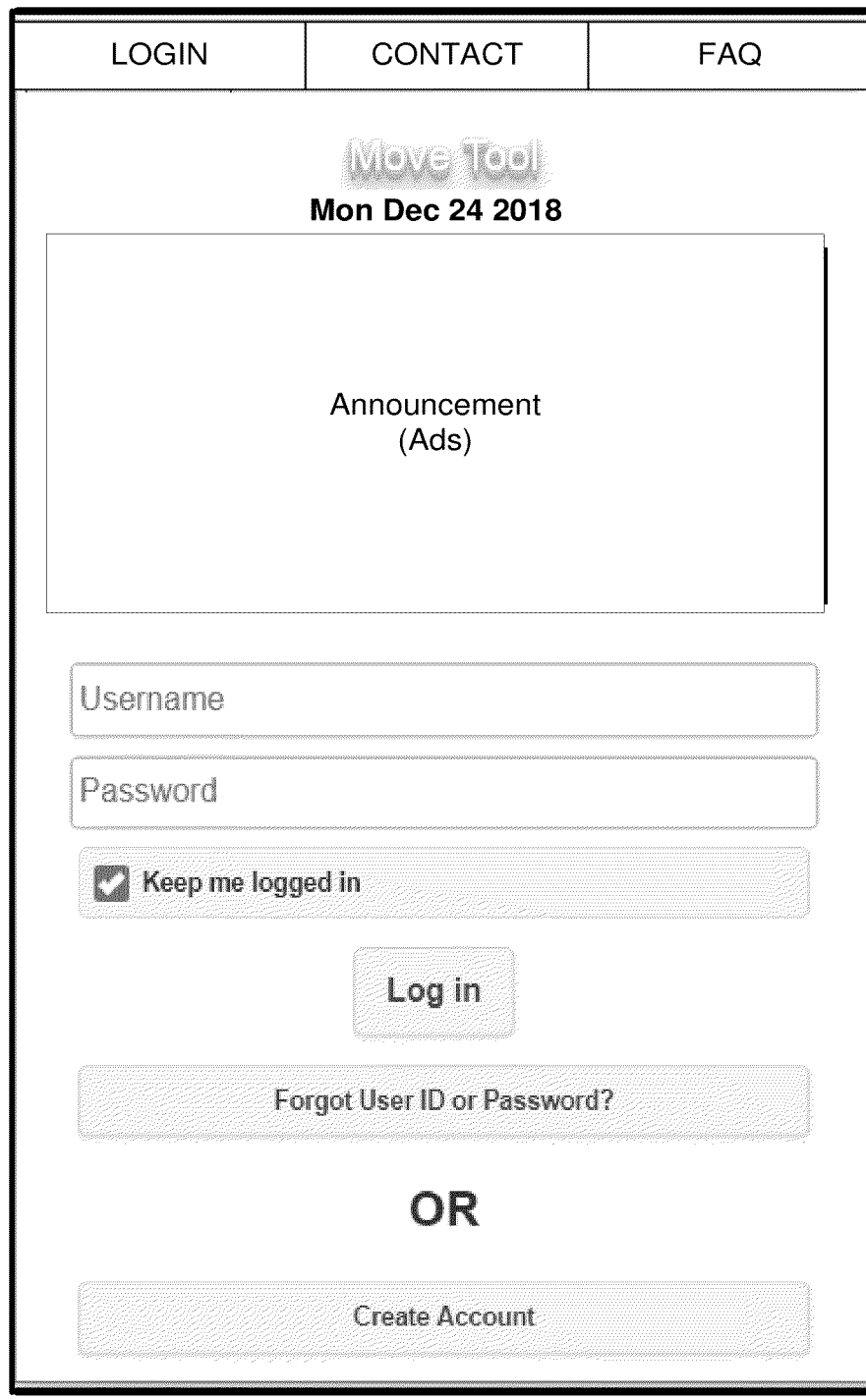
Figure 1:
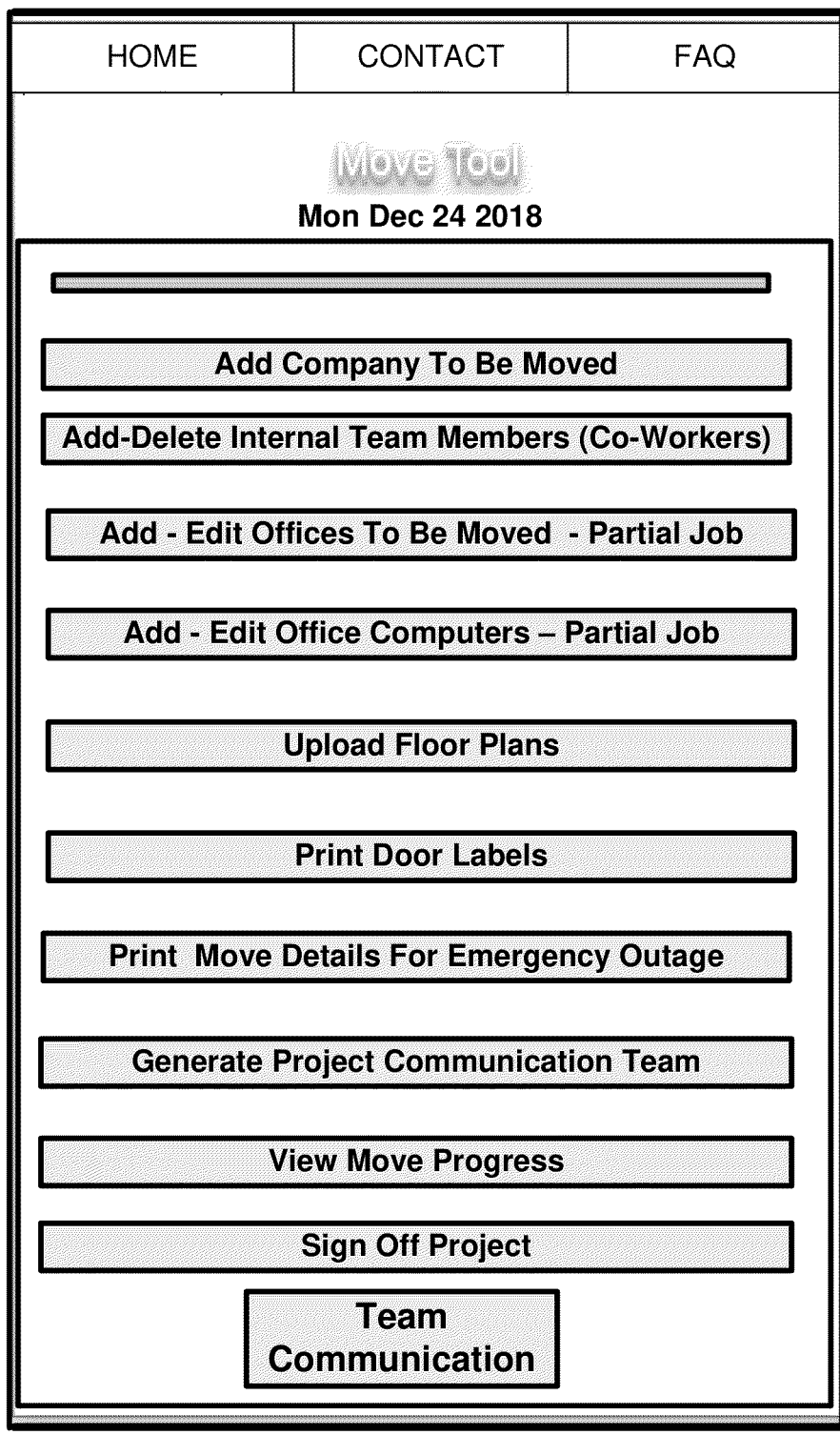

| HOME | CONTACT | FAQ |
|---|---|---|

Mon Dec 24 2018

- Add Company To Be Moved
- Add-Delete Internal Team Members (Co-Workers)
- Add - Edit Offices To Be Moved - Partial Job
- Add - Edit Office Computers – Partial Job
- Upload Floor Plans
- Print Door Labels
- Print Move Details For Emergency Outage
- Generate Project Communication Team
- View Move Progress
- Sign Off Project
- Team Communication

(56) References Cited

U.S. PATENT DOCUMENTS

| | | | | |
|---|---|---|---|---|
| 2014/0074582 | A1* | 3/2014 | Ben-Harosh et al. | G06Q 30/0282 705/347 |
| 2014/0164042 | A1* | 6/2014 | Halvorson et al. | G06Q 10/06313 705/7.17 |
| 2014/0337157 | A1* | 11/2014 | Burlin | G06Q 30/0611 705/26.4 |
| 2014/0344097 | A1* | 11/2014 | Horowitz et al. | G06Q 30/0284 705/26.4 |
| 2015/0026696 | A1* | 1/2015 | Gillam | G06Q 10/06311 718/104 |
| 2015/0371305 | A1* | 12/2015 | Ganapathy | G06Q 30/0613 705/26.41 |
| 2016/0117638 | A1* | 4/2016 | DiSorbo | G06Q 10/083 705/333 |
| 2017/0024685 | A1* | 1/2017 | DiSorbo | G06Q 10/06398 |
| 2019/0180209 | A1* | 6/2019 | Syed et al. | G06Q 50/28 |
| 2020/0394596 | A1* | 12/2020 | Sager et al. | G06Q 10/067 |

* cited by examiner

Client Add Company To Be Moved

| HOME | CONTACT | FAQ |
|---|---|---|

Move Tool
Mon Dec 24 2018

Add Company To Be Moved

Company ID (EIN)
Company Name
Billing Address
City
State
Zipcode

Account Number

Contact Name
Contact Phone 1
Contact Phone 2
Contact Email

Restrictions ▼

Notes

Submit

---

EDIT EXISTING COMPANY

Company Name ▼    OR Company EIN

Edit

FIG 2

Client add Internal Co-Worker or Edit Existing Employee

| HOME | CONTACT | FAQ |

Move Tool
Mon Dec 24 2018

Add Internal Project Team Member

User ID
First Name
Last Name
MI
Title: Title
Sex: ( ) Male  (x) Female

Cell Phone
Email

Notes (Optional)

Edit Employee

Enter Employee ID
OR
Select Employee Name: Lawrence M

Edit

FIG 3

CLIENT ADD PEOPLE TO BE MOVED (OFFICE OWNERS) – Add Job

| HOME | CONTACT | FAQ |
|---|---|---|

Move Tool
Mon Dec 24 2018

People To Move | Computer | Furniture

Date Pick

Company Moved | Job Number

Global World, Inc

Job Number 003427
Move Date July 22 2016
Move Time 8:00 AM

First Name — Auto complete
Last Name — Auto complete

Original Address

Street Address
City
State
Zipcode
Office No.
Phone
Priority   ⊗ High  ○ Medium  ○ Low

Destination Address

Street Address
City
State
Zipcode
Office                     Fill Address
Move Color
Phone Placement      L   R Special Instructions Submit

FIG 4

Add Office Owner

| HOME | CONTACT | FAQ |
|---|---|---|

Move Tool

Mon Dec 24 2018

Add Office Owner Manually

Company Name [Auto fill]
Job Number [Auto fill]
First Name [ ]
Last Name [ ]
Phone 1 [ ]
Phone 2 (optonal) [ ]
Email (optonal) [ ]

Origin Address [ ]
City [ ]
State [ ]
Zipcode [ ]
Floor - Suite [ ]

Destination Address [ ]
City [ ]
State [ ]
Zipcode [ ]
Floor - Suite [ ]

Priority    ⊗High    ○Medium ○ Low

Upload Setup Pics [ ]
Execution Date [Touch fill]
Start Time [8:30 am ▼]
Approx End Time [5:30 pm ▼]

Special Instructions [ ]

[Submit]

EDIT EXISTING OFFICE OWNER

[Enter The Job Number] [OR Company EIN] [Edit Project]

FIG 5

CLIENT ADD OFFICE COMPUTERS – Add Job

| HOME | CONTACT | FAQ |
|---|---|---|

Move Tool
Mon Jun 13 2016

| People To Move | Computer | Furniture |
|---|---|---|

Computer Data Entry: Origin

Enter Office # | Name Auto Fills

| | 0 | 1 | 2 | | |
|---|---|---|---|---|---|
| Desktop | 0 | 1 | 2 | 1 | Delete |
| Laptop | 0 | 1 | 2 | 0 | Delete |
| Dock Station | 0 | 1 | 2 | 0 | Delete |
| Power Strip | 0 | 1 | 2 | 2 | Delete |
| Key Board | 0 | 1 | 2 | 1 | Delete |
| Monitor | 0 | 1 | 2 | 2 | Delete |
| Mouse | 0 | 1 | 2 | 1 | Delete |
| Speakers | 0 | 1 | 2 | 2 | Delete |
| Webcam | 0 | 1 | 2 | 0 | Delete |
| Scanner | 0 | 1 | 2 | 0 | Delete |
| Local Printer | 0 | 1 | 2 | 1 | Delete |
| Lan Printer | 0 | 1 | 2 | 0 | Delete |
| Fax | 0 | 1 | 2 | 1 | Delete |
| Headset | 0 | 1 | 2 | 1 | Delete |
| Card Reader | 0 | 1 | 2 | 0 | Delete |
| Hub | 0 | 1 | 2 | 0 | Delete |
| Phone | 0 | 1 | 2 | 1 | Delete |
| Monitor Mount | 0 | 1 | 2 | 2 | Delete |
| Monitor Tension | 0 | 1 | 2 | 0 | Delete |
| Wire Mgmt | 0 | 1 | 2 | 2 | Delete |

Comments

Submit Comment

FIG 6

Client Job Sign Off And Rating (Post Move)

| HOME | CONTACT | FAQ |

Move Tool
Mon Jun 13 2016

Job Sign Off and Rating

Job Number 003427

Move Date    July 22 2016

Move Time    8:00 AM

End Time    4:00 PM

Job Different ?

[ Select Job ▼ ]

Rate: (0) (1) (2) (3) (4) (5) ☆

[ Comments ]

[ eSigniture ]
[ Toggle Confirm Signature ]

[ Submit ]    [ Home ]

FIG 8

Moving Employee Default User Interface

Single Office Status (Packing, Computer & Furniture)

PC Tech Data Entry Destination Office User Interface

| HOME | CONTACT | FAQ |
|---|---|---|

Move Tool
Mon Jun 13 2016

| Packers | PC Tech | Installer | Mover |
|---|---|---|---|

Computer Data Entry: Destination

Count

Office # Auto Fills | Name Auto Fills

| Item | | Count | |
|---|---|---|---|
| Desktop | Confirm | 1 | Edit |
| Laptop | Confirm | 0 | Edit |
| Dock Station | Confirm | 0 | Edit |
| Power Strip | Confirm | 2 | Edit |
| Key Board | Confirm | 1 | Edit |
| Monitor | Confirm | 2 | Edit |
| Mouse | Confirm | 1 | Edit |
| Speakers | Confirm | 2 | Edit |
| Webcam | Confirm | 0 | Edit |
| Scanner | Confirm | 0 | Edit |
| Local Printer | Confirm | 1 | Edit |
| Lan Printer | Confirm | 0 | Edit |
| Fax | Confirm | 1 | Edit |
| Headset | Confirm | 1 | Edit |
| Card Reader | Confirm | 0 | Edit |
| Hub | Confirm | 0 | Edit |
| Phone | Confirm | 1 | Edit |
| Monitor Mount | Confirm | 2 | Edit |
| Monitor Tension | Confirm | 0 | Edit |
| Wire Mgmt | Confirm | 2 | Edit |

Comments

Submit Comment

FIG 11

Confirm Office Completion

Moving Company Employee Add People You Worked With in an Office

| HOME | CONTACT | FAQ |
|------|---------|-----|

Move Tool
Mon Jun 13 2016

Add Office Team Member (Installers-Packers)

Name 1
Name 3
Name 6
Single Worker

Name 2

Name 4

Title

(x) Installers ( ) Packers

Submit

FIG 14

Algorithm To Display and View Office Status

MOVE TOOL SYSTEM

BACKGROUND OF THE INVENTION

This application claims the benefits of provisional Application No 62/610,577 filed Dec. 27, 2017 titled Move Tool System. The Move Tool software system streamlines moving processes by providing real time data entry and communication services. It utilizes data driven interfaces that generates buttons based on data. It is utilized by companies with hands on employees such as moving companies and their clients. It is comprised of a Mobile App, a Web based Interface and a backend infrastructure that stores data. It enables movers, their employers and the clients they move to view the moving process in real time and update the functions involved as pieces are completed one by one. Pieces refer to offices or assembled units including furniture, computers and office accessories. The system includes a communication module that enables all parties involved in a move to communicate on issues regardless of their building or floor locations.

BRIEF SUMMARY OF THE INVENTION

The Move Tool does not only give moving supervisors relief but shows the movers what to do next when they are done with a task at hand or unit, make them more independent of a supervisor and accountable other than relying on or waiting for a supervisor to tell them what to do next. Each time an employee completes a task, they touch a button to save their accomplishment. The tool tallies each employee's accomplishments and can be used to determine the rate at which employees work. It provides other statistical data based on weighted index of all the things moved in an office.

It is estimated to save about two hours on a ten hour job. That is a job that would take 10 hours may be accomplished in only eight hours since employees don't have to wait for the manager to show them where the work is or what to do next and the tool tallies each employee's work. Recordation or tallying encourages the employees to be the best in absence of a supervisor which means money for the moving company.

In addition, a moving company runs statistical analyses to determine rates at which a job is running, worker participation rates and project completion time at given intervals.

Using this technology, one can find out employees that earn credit by working and those that earn credit by sweet talk or other means.

A senior supervisor or project manager is enabled to remotely assist on multiple jobs by advising junior supervisors on how to proceed based on the situations on the ground as seen via the technology. This is regardless of whether they are in the field or office setting.

The design is independent of hardware, operating system or software development technologies. The software system is data driven with a database or files in the backend. The software can be developed utilizing cross platform hybrid technologies such as JavaScript, CSS, HTML for the front end and a server side technology in which SQL is embedded to accessing the data. Alternatively, native technologies such as Java for Android, C-Shop for Iphone and others can be utilized.

Besides accessing the software system from mobile devices, the computer based interface accesses the software system from a website. All access to data is by authentication though one can save the password to ease the login process. Like the website or large screen presentation, the mobile interface interacts with the data on the server to provide information to the users. If a user has no mobile app on their device, they log onto the service website and access the data from any device.

Office based users enters data via their computer into the data storage on the server and the mobile application retrieves the data and displays to the user as necessary. Similarly, mobile users do real time data entry that goes to the server and get viewed by any of the authorized personnel regardless of whether they have mobile devices or office based computers.

The software system provides features such as simplified data entry based on touch buttons that users don't have to open to type the required information. Data is pre-entered into the database during the preparation phase and loaded to the mobile devices during the execution phase also referred to as runtime. Even when data is not pre-entered, touch buttons and selection menus are utilized to enter the data.

Upon launching the application, it displays a menu corresponding to user type as seen in the user interfaces ahead. The Move Tool application is customizable to company needs.

The Move Tool works in conjunction with a scheduler and the Comtool software systems. In another implementation, the projects entity and messaging data entities are built into the Move Tool and users (project team members) are added from within the Move Tool for it to work independently.

The Comtool which is a separate app, works with the move tool to provide a team communication environment that enables all workers on a job to know the job details. Users are not required to log onto the Comtool separately, their logon onto the Move Tool enables them to communicate from the Comtool.

The messaging software application enables a project team to communicate though the team is composed of two or more groups. The client internal staff that works on the project is one group and the employees of the company hired to do the actual work is another group. This company may be a moving company or other type.

To create a project team, the client selects a project name from a dropdown or enters a project number to display the project. The client then hits the button labeled "Generate Project Team" which takes the project number, date and time of execution then sends queries to the database to extract scheduled employees.

It selects all employees from the schedule where project number = project number provided and execution date = date, time. That returns all people scheduled to work on that particular project. They are inserted into the Project Team Entity along with the ones extracted from the internal employees entity to communicate on the project.

The software system provides features such as simplified data entry based on touch buttons that users don't have to open to type the required information. Data is pre-entered into the database or file during the preparation phase and loaded to the mobile devices during the execution phase. The company to be moved is entered in advance. The job to execute which includes offices, people and computer information is also added in advance. The computer technicians that disconnects and reconnects only confirms the data displayed in or near the button links. When computer data is not pre-entered, a multi-selection user interface is utilized by the PC Techs and other workers to enter the data. The interface is also easy and user friendly because it provides button links and dropdown selection menus for data entry to prevent errors.

The Move Tool works in conjunction with a scheduler to obtain names of scheduled employees to be part of the project communication team. It also works with the Comtool software systems which is the actual communication software.

In another implementation, the projects entity is built into the Move Tool and users (project team members) are added from within the Move Tool. That makes the Move Tool an independent product.

The messaging software application enables a project team to communicate even when the team is composed of two or more groups of people that are different. The client internal staff that works on the project and the employees of the company hired to do the actual work. This company may be a moving company or other type.

The project communication team is a temporary team that lasts only up to the end of the project but the users retain the ability to communicate in general and on other project teams. After a set time, communications from a project team are automatically deleted.

Prior to the move phase, floor plans and computer setup images are uploaded to the server for movers to access from their mobile devices. This helps them to find offices easily and setup computers the way the office owners want them. In addition, the interface displays the side to which the phone should be located.

The application software system provides means for printing the move information in the database for reference just in case connectivity is lost. This includes printing office locations, names of office owners and door labels. A fundamental feature of this software system is the ability to display completed and unfinished work at any given time. This provides users with ability to quickly see where they have to go to do the work without waiting for their supervisors. It creates a self dependency in the minds of the employees.

BRIEF DESCRIPTION OF THE DRAWEINGS

FIG. 1A Involves launching an app on a mobile device or computer and displaying an interface with tabs wherein one tab displaying as a default interface with an application title or company title followed by a date. The interface also displays a dedicated window for announcements and ads from third party sources. It further displays a login text field and a password text field. These are followed by a keep me logged in check mark for maintaining a logon status. A submit button is labeled Log In. This is followed by a button link for resetting a forgotten password. The login tab also has a create account button link that invokes an algorithm to submit information to memory in a server to create a user account.

[FIG. 1 involves launching an application on a mobile device or computer; and entering a phone number or email and a password to create a user account. A user with an account logs in, gets authenticated, and identified by a user type which is based on a user title or other attribute. The system, displays a menu interface corresponding to the user type and the user of type client, gets a menu interface with button links including but not limited to Add Company To Be Moved, Add-Delete Internal Members (Co-Workers), Add-Edit Offices To Be Moved, Add _Edit Office Computers, Upload Floor Plans, Print Door Labels, Print Move Details For Emergency Outage, Generate Project Communication Team, View Move Progress, Sign Off Project and Team Communication for instant messaging and phone coordination. Pressing or opening each of the button links displays a new interface that accomplishes the tasks designated for the button link and submit buttons on the interfaces interacts with algorithms to transmit instructions to a processor and save, process or retrieve data from a database or file in memory of a server. Pressing and opening the Team Communication button link displays a communication interface not shown and the interface provides buttons for instant messaging and phone communications specific to a project.. Communication takes place between the client company, pc techs, installers, parkers, movers and any other group working on the project. Not shown is an interface with a user login and a button link for creating a new account by invoking an algorithm to populate database entities. It provides a designated window for displaying announcements related to a current or ongoing project and ads from third party sources. The announcements and ads are displayed in form of text, video, audio and links in a mobile phone app linked to a database or file system in server memory.

FIG. 2 is utilized to enter a company to be moved providing company ID which could be Employer Identification Number (EIN) or other, company, address and contacts including phone numbers and emails. The interface relates to providing a method of restricting workers on projects that involves filtering workers, documenting workers and restricting workers via interfaces with dropdown menus, text fields and text areas. The bottom part of the interface relates to selecting a company name or selecting a company utilizing its id such as EIN and a client editing the company information including address, account number, phone numbers and emails.

FIG. 3 involves a client adding employees as project team members to a project and deleting employees from a project utilizing an interface where a client enters name, title, gender, phone number, email and notes. The bottom part of the interface involves selecting an employee already in the system by id or by name and submitting the selection to display a new interface from which to edit employee details. Alternatively, the client provides an employee with a company code and a project number and the employee enters the rest of employee details. Displaying another button link named Add-Delete Internal Team Members, and pressing the button link automatically adds co-workers to a project communication team. The client presses a button link named Generate Project Communication Team and the generate project communication team button internally selects a project number, execution date and time and sends queries to the scheduling database to extract names of people scheduled to work on that project at that time and the moving company employees are inserted intoa data structure or file utilized in a software module. Also added to the project team entity along with the internal employees for instant messaging and phone communication for coordination on a project.

FIG. 4 relates to adding people (offices) to be moved to the system. The menu interface of FIG. 1, displaying a button link named Add - Edit Offices To Be Moved opens this UI. A user choosing to add an office to be moved displays a user interface to add the office and office owner. The user edits office entry and assigns a move priority for sorting of the offices in case some need to be prioritized and moved before others and the users also sets color of the move to easily identify office priority.

FIG. 5 relates to adding office owner manually. This includes adding a company name, office owner personal info, move origin info, move destination info, office number priority and computer setup images. Access is also given to office owners to enter the office details.

FIG. 6 This figure ads people details, computers, accessories and furniture. The menu interface displaying another button link named Add - Edit Office Computers to be moved and if the user chooses to add a computer or some other electronic such as a server, a GUI is displayed for entering the data. Utilizing touch buttons or selection menus, the user enters computer data and submits to save to the database or file in server memory. Computers, accessories and furniture may be added using individual interfaces on a mobile device or computer instead of tabbed interfaces.

Figure 7:

FIG. 7 the menu interface of FIG. 1 displaying another button link named View Move Progress wherein pressing the button link opens a new interface displaying all offices that are completed with a highlighted color and uncompleted offices are displayed with a color that indicates that the offices need to be worked on. This provides users with ability to know in real time what offices needs to be worked on and what offices to inspect and sign off.

FIG. 8 relates to the menu interface of FIG. 1 displaying another button link named Sign Off Project wherein pressing the button link displays an interface showing a current job number, date and time the job was performed and a job selection menu incase the job is different from what is displayed. The interface comes with a rating option for rating performance of a team or an individual employee wherein the rating option provides a comments section where the user enters comments; and rating results are displayed to any website of choice. The interface provides a payment button FIG. 9 relates to an interface for tracking project progress including but not limited to office identification move color, name of office owner being moved, move status which is showed by two button links one for a origin office and another for a destination office. It provides a more data entry button link which opens new interfaces that generates button links by embedding data from the database. A home button link utilized by moving company workers namely packers, pc techs, installers, movers and any other category returns to a home page. When the origin office is completed and data is saved, the origin button automatically changes color and label from origin-open to O-View Team, and when both origin and destination offices are completed and recorded, the two button links that identifies a moved office are replaced by one button link labeled View-Team and highlighted with a bright color. Pressing the view-team button link displays the moving employees that worked in the office by type of work. That is, PC Tech, Modular Installer, Packer, Mover and any other type.

Figure 10:
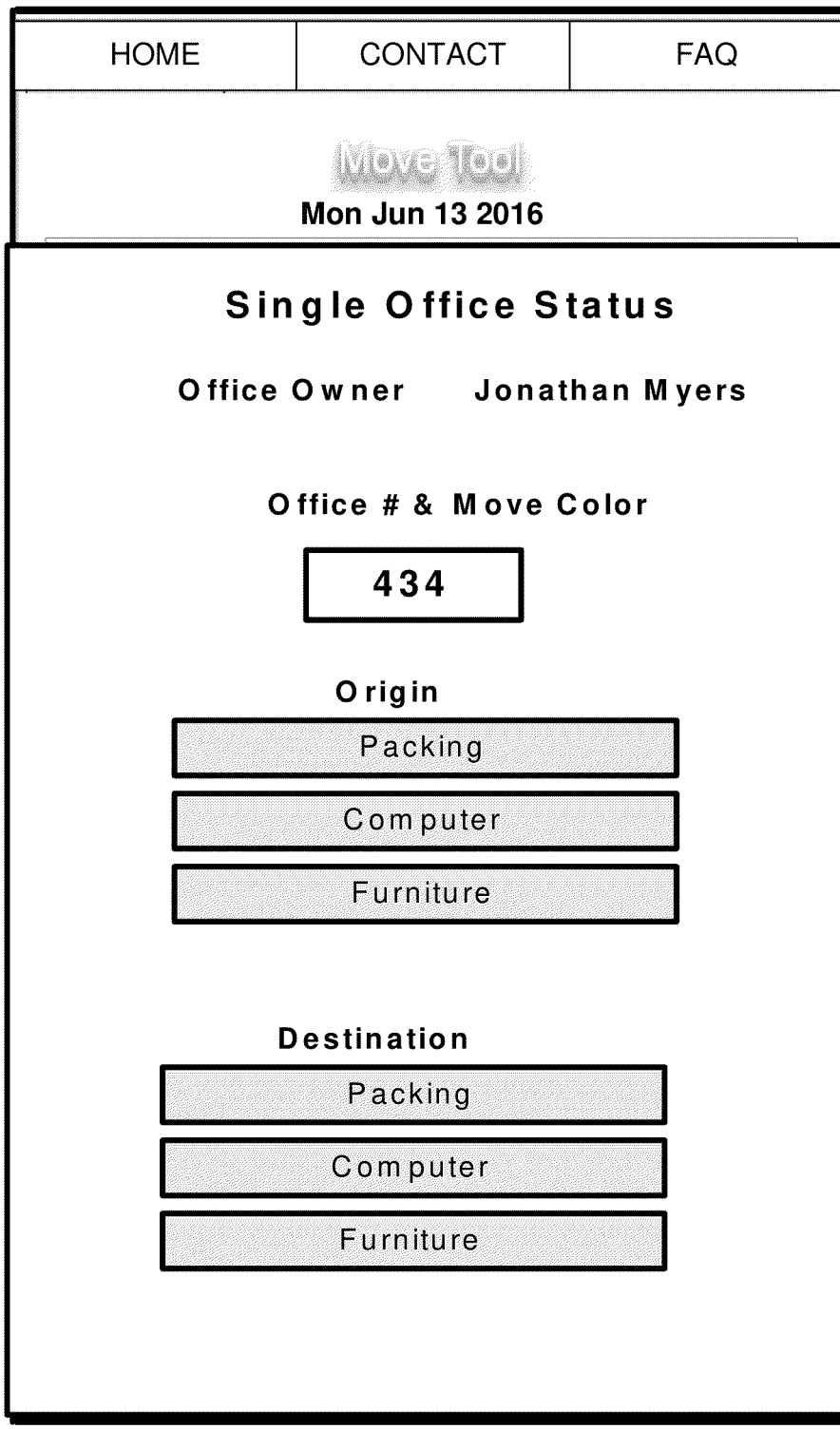

FIG. 10 Data is pre-entered into the system and embedded into button links as needed. Data entry users only press buttons or selection menus to confirm. An authenticated user gets a user interface (UI) based on user type. An Installer gets an installer UI to confirm completion of furniture disassembly at the origin office or furniture assembly at the destination office. An authenticated user of type Packer, presses the packer button link on the UI to confirm completion of content packing in an office. All users that worked in the office on packing are recorded and related to office number.. When the installer, pc tech and packer are all completed at the origin and presses the respective completion buttons, the origin-open button link is highlighted for the movers to move the office. An authenticated user of type mover presses the mover button on the UI to indicated that the origin office is moved and this indicates to the Installers and PC Techs at the destination that the office is ready to reassemble. The Installer and PC Tech respectively presses button links to indicate office completion at the destination and the two status buttons are replaced by one button labeled view Team.. A completed office at the origin is moved as a whole or partially as packing, pc disassembly or furniture disassemble is completed. Each user type PC Tech, Packer and Installer have a button to indicate completion of that part of the move.

FIG. 11 relates to users and data entry. Moving company employees, primarily divided into four categories namely packers, pc techs, modular installers and movers. They create user accounts in the system entering email, phone number and a password. The employees can change account information such as email and phone number utilizing a button link that opens an interface with text fields and a submit button for changing email, phone number, address and other personal data. Alternatively, accounts are created for them. At logon, each user type is authenticated to a UI specific to what they do. The UI in FIG. 11 shows computer data entry only by confirming.

Figure 12:

FIG. 12 relates to PC Tech entry of computer information. Pre-entered data is displayed. Data entry only confirms or use a drop down menu to edit. They record quantity of all items moved including wire management and submits comments.

Figure 13:

FIG. 13 is an interface on a mobile device or computer for recording and retrieving commercial moving data in a move tool system that electronically tracks and provides coordination for moving activities via a mobile phone app or computer browser. The system provides interfaces for packers, PC Techs, Installers and Movers and the interfaces display by user type at login. Each user type views data but data entry is restricted to title and tasks as configured by a supervisor or company. All categories of employees may utilize a tabbed interface but FIG. 13 shows an installer as a sample and the button links that are displayed depends on company configuration. A worker with multiple permission levels accesses all permitted categories through a tabbed interface such as FIG. 9. To enter data, an employee enters office number and name of the office owner pops up as entered during the preparation phase.

FIG. 14 relates to a user adding team members that have worked in an office. All workers or employees scheduled to work on a project are displayed on the left. Pressing a name on the left side adds it to the office team for a specific type on the right. That is, A Packer adding team members in office 214 use a radio button or other method to sort out only packers then selects all packers that worked in the office. The submit button invokes an algorithm that transmits data to a database or file on a server.

Figure 15:

FIG. 15 relates to data storage and communication. The system utilizes a database schema in conjunction with data driven interfaces to electronically track and link offices moved to workers that move the offices and office owners. This is accomplished in conjunction with data driven interfaces that interacts with the database schema on the server through algorithms generating buttons including phone number buttons based on pre-entered data as shown. Phone numbers of team members are embedded in buttons showing names instead of phone numbers and displayed as call buttons against names and the actual phone numbers are not displayed to the team. Team members that worked in an office are tracked by calling the phone button links which are indicated by user type as Packers, PC Tech, Installers and Movers on the UI.

Figure 16:
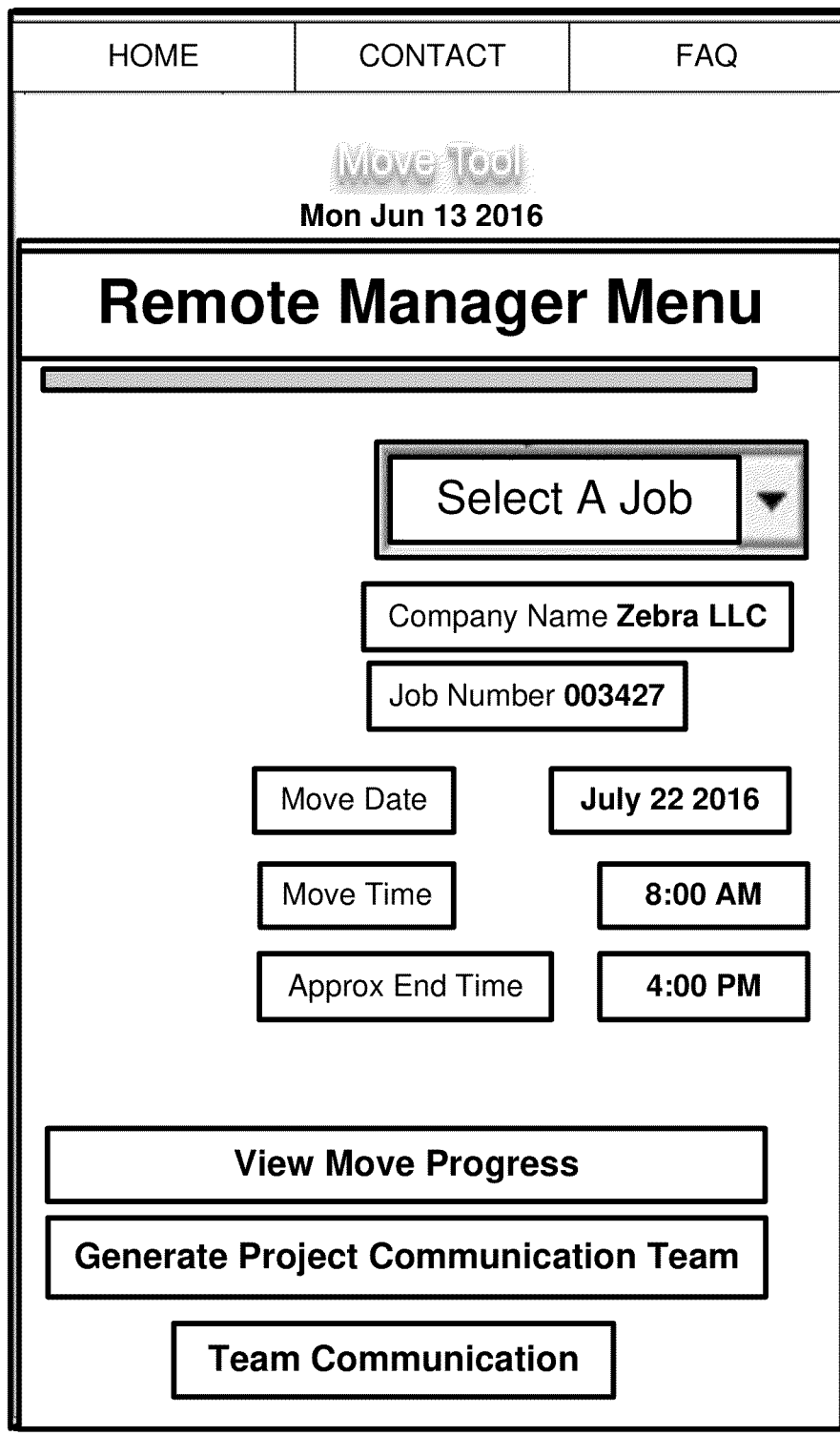

FIG. 16 is a remote manager interface. A remote manager selects a job and displays job details including a company being moved, job number, date and time. The manager presses the button links to view move progress, generate project communication team and also get involved in the team communication using instant messaging and phone interaction.

Figure 17:
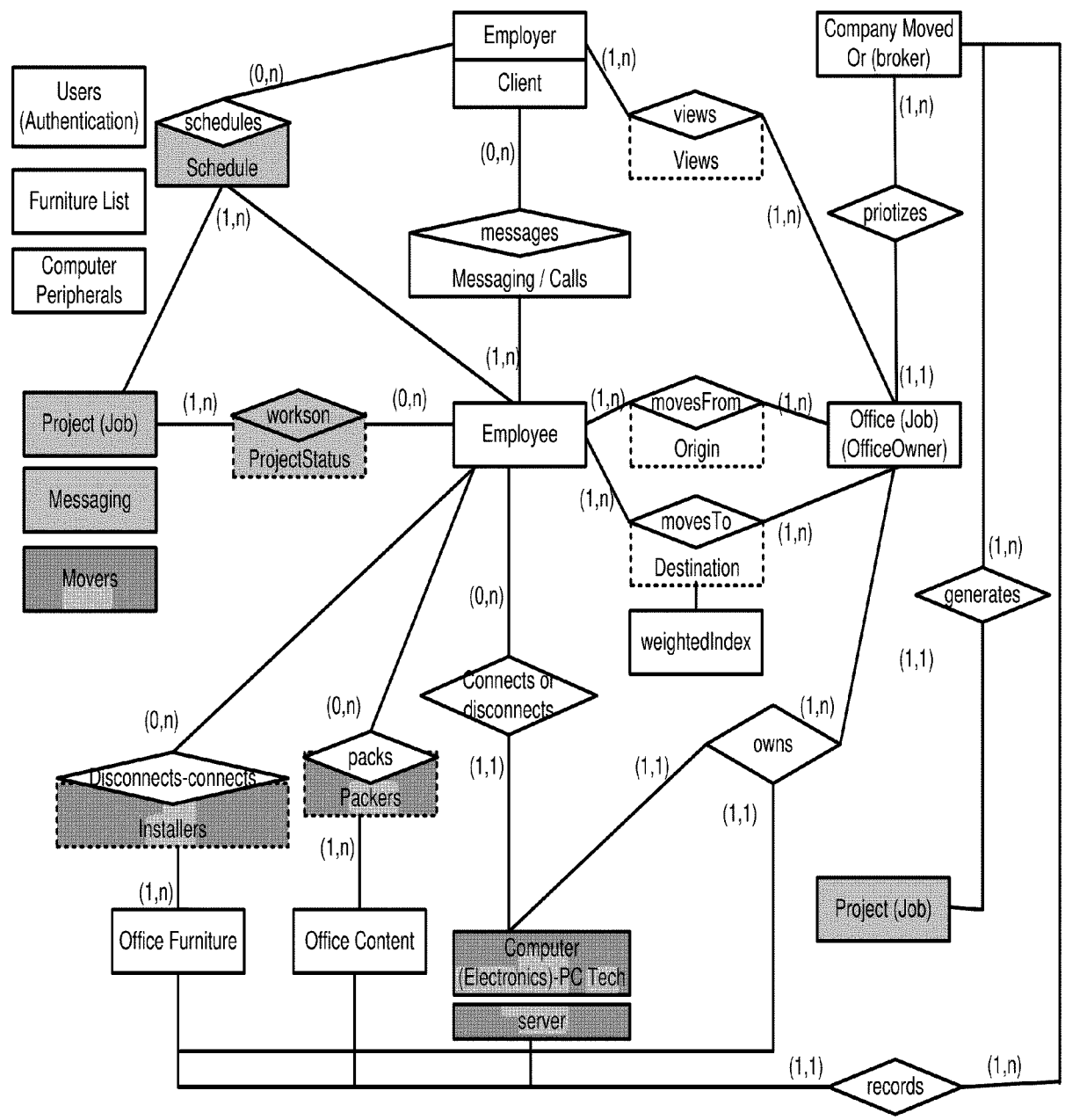

FIG. 17 involves configuring a computer system having an ER-Model that generates a database schema utilized in an RDBMS and other database systems for data storage. The ER-Model with various entities that relate as shown having attributes some of which shown in the drawing of FIG. 18. Relating entities to generate an ER-Model for determining a database schema and installing the database schema on a server to store moving data. The entity Employee relating to the entity Office by a many-to-many relationship generating the entities Origin and Destination for storing and retrieving origin and destination move activity data. However, all data may be stored in one entity. The entity Client relating to the entity Office by a many-to-many relationship generating the entity views for linking the client to offices and viewing activity data. The activity data is stored in at least one entity and viewed by clients and employees on a project. Having an ER-Model with an entity Computer or Electronics with attributes as listed in the database schema storing computer, server and other electronics data, and an entity Office Furniture with attributes as listed in the database schema storing furniture information and an entity Office Content with attributes as listed in the database schema storing office content data besides electronics and furniture. At least one entity with any name stores electronics, furniture and office contents. Other forms of databases may be utilized instead of a RDBMS.

Figure 18:
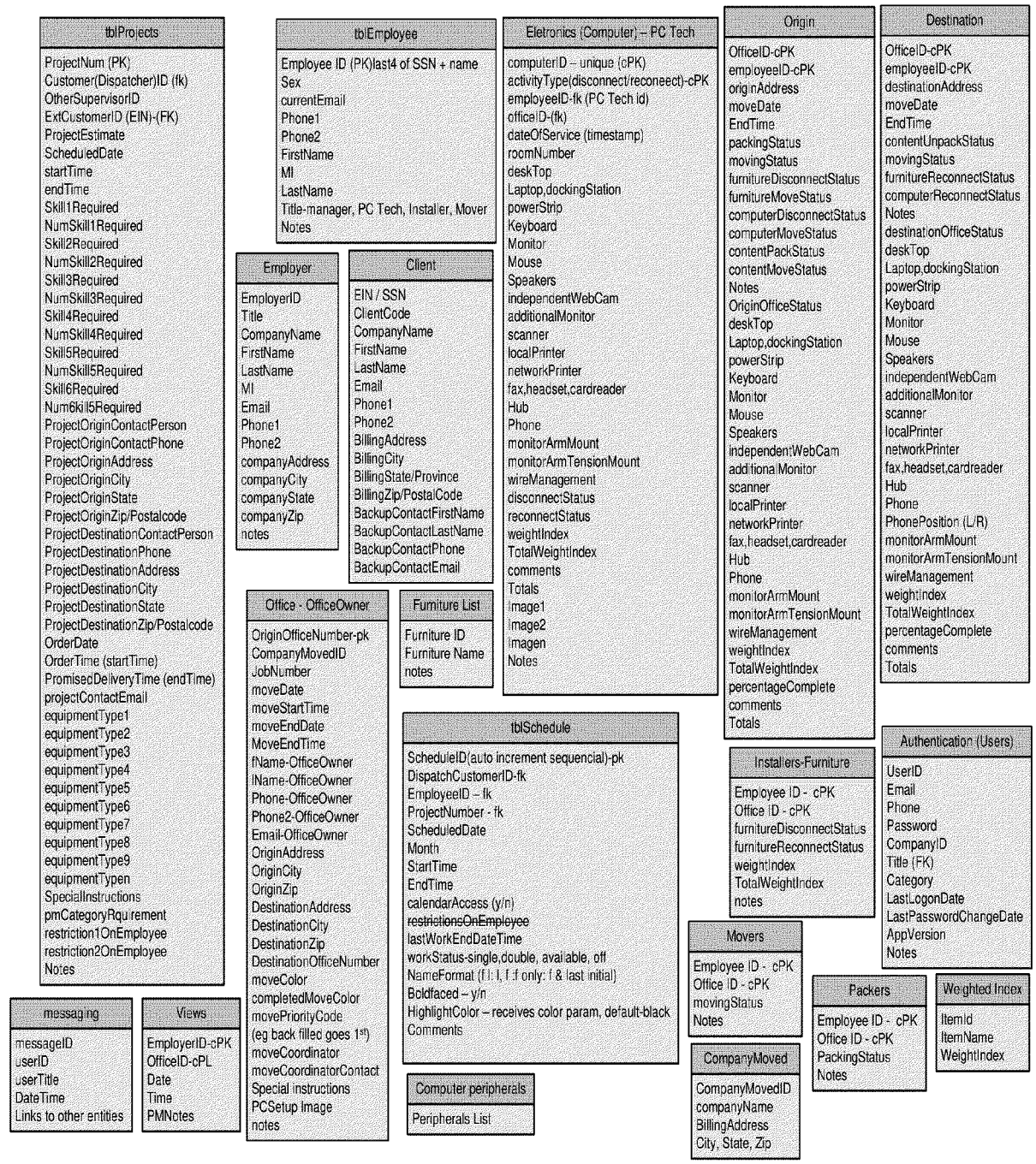

FIG. 18 is a database schema having entities Authentication, Users, Client, Employee, Employer storing user registration and authentication data in the database schema, and the data attributes including all or some of the attributes namely UserId, first name, last name, current email, phone number, password, company Id, title and notes. At least one entity stores user registration and authentication data in the move tool system. A Messaging entity in the ER-Model storing data relating to instant messaging between a moving company employees and a client company on a project wherein at least one entity storing instant messaging data. A Schedules entity in the ER-Model with attributes as listed in the database schema storing schedule data relating to the Employee entity with attributes as listed in the Employee entity sharing employee Id as a primary key, and a Project entity in the ER-Model with attributes as listed in the database schema relating to the Schedules and Employee entities wherein the at least two entities stores schedule and employee data for use in the instant messaging and phone communication. The main entities as listed with corresponding attributes are utilized in transactions. User titles and a supervisor title are configured to have data entry access to more than one interface and the user id of the employee is recorded in the database in memory to indicate who entered the data.

Figure 19:
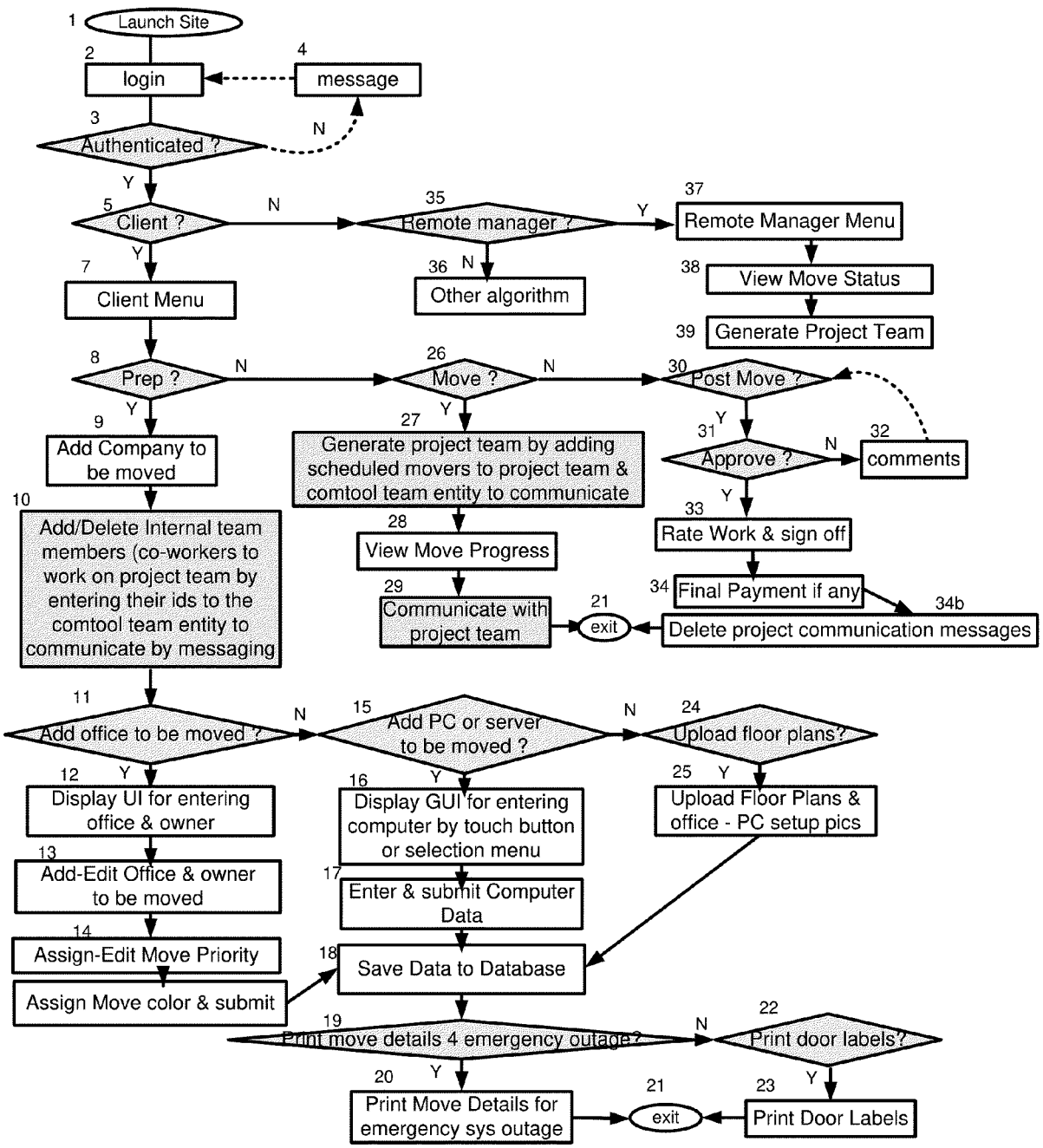

FIG. 19 relating to an algorithm for client data processing that authenticates a client to the client menu interface to perform tasks in prep, move and post move phases wherein the prep phase tasks includes but not limited to adding a company to be moved, adding team members to work on a project team, adding office and office owner to be moved, assigning and editing move priority, assigning move color to offices, adding computers to be moved utilizing touch buttons or selection menus, uploading floor plans and editing any data entered utilizing the button links.

Figure 20:
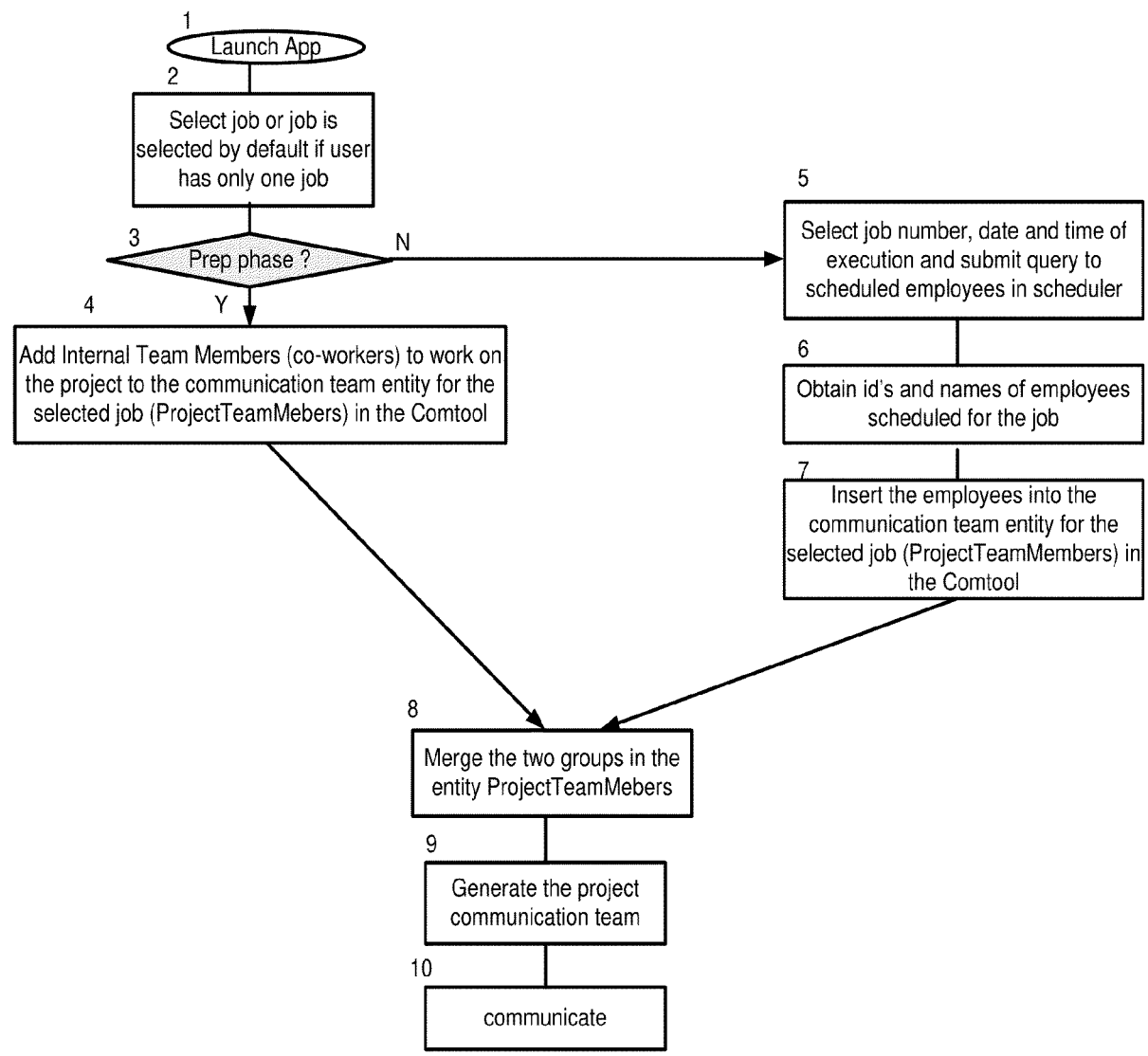

FIG. 20 relates to an algorithm for adding members to a project communication team. The algorithm tests for the prep phase and adds a group of internal team members or co-workers scheduled to work on a project, to a project communication team entity for a job to be executed. The algorithm selects a job or project number, date and time of execution and submits a query to a mover scheduling database to obtain workers scheduled for the project and the algorithm inserts the moving workers names and contacts into the communication team entity merging the two groups into one project team for communication. Pressing the generate project communication team button link on the menu interface, displays all users in the project communication team. Workers and employees are interchangeable in this application.

Figure 21:
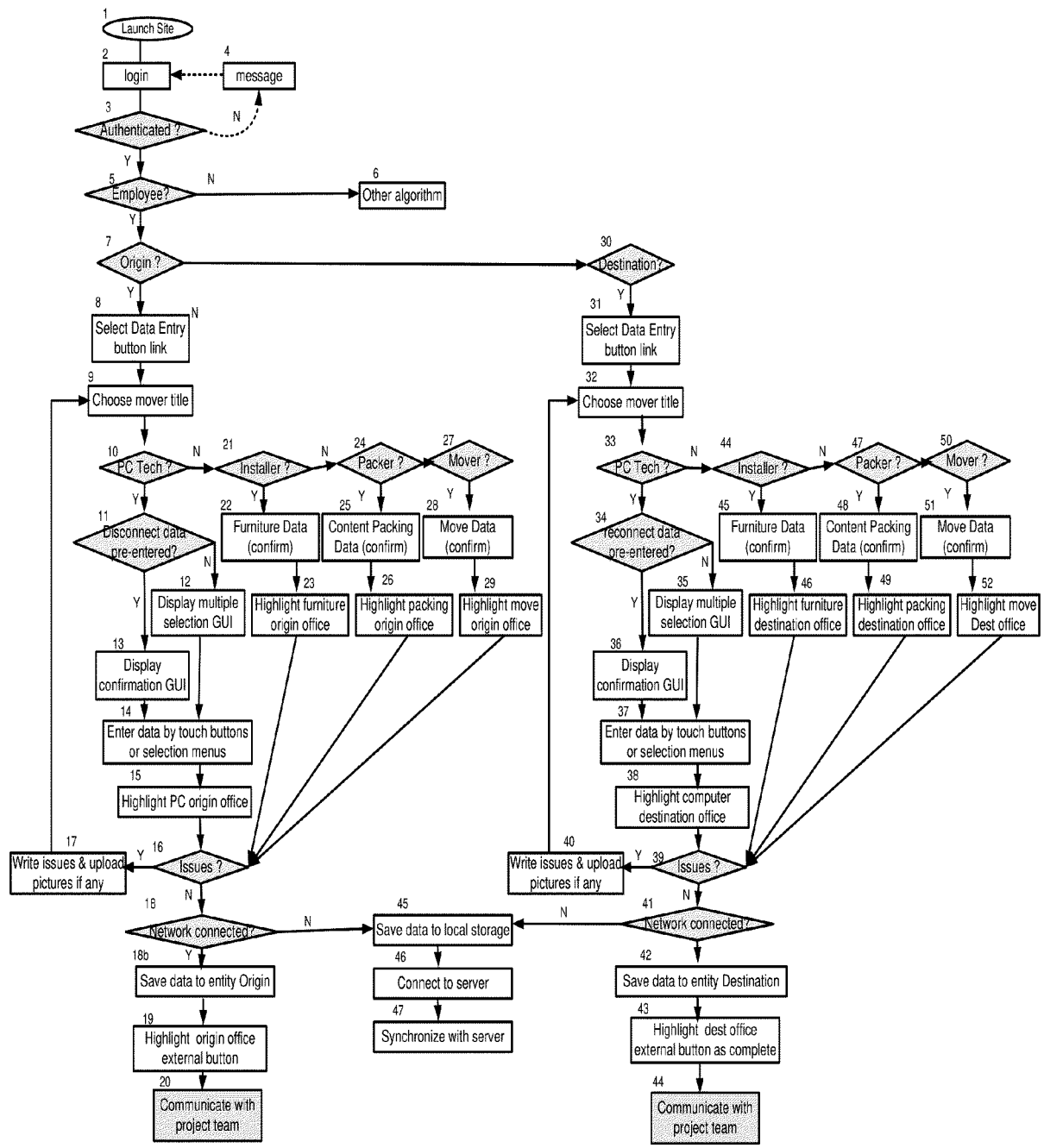

FIG. 21 is an algorithm for controlling moving company employee data entry comprising a user with an account entering email or phone number and a password, and getting authenticated and tested for user category whether client or moving employee. The algorithm tests utilizing a user title or other identification in the database; and the algorithm tests if the authenticated user is at an origin office or destination office and further tests user type of the user. If the user is of the type moving company employee, the algorithm displays an interface corresponding to the user category and user type providing button links with data pre-entered into the database during a preparation or prep phase and loaded to the mobile devices application touch buttons during a execution phase for confirming data entry into the system database. Data is entered into the database utilizing the touch buttons with pre-entered data or multi-selection graphical user interfaces to prevent errors and saving data, changes color of the office button in the move progress interface to indicate office completion for all to know that the office is complete. The system records user id of the employee doing data entry and office id linking the office moved to workers that moved said office. At anytime, sers change account information including email and phone number utilizing a button link that opens an interface with text fields and a submit button for changing email, phone number and other personal data to update the system. When the pc tech computer disconnect data is not pre-entered by the client or broker, the algorithm displays multiple selection GUI s and the pc tech enters data by touch buttons or selection menus and automatically highlights PC origin office to indicate completion. Record any issues and saves all the data to the origin entity. When another pc tech worker is authenticated at the destination office, the worker selects data entry button links by mover title and views a completed origin office displayed as a confirmation GUI with a highlighted color indicating completion of the origin office.

Figure 22:
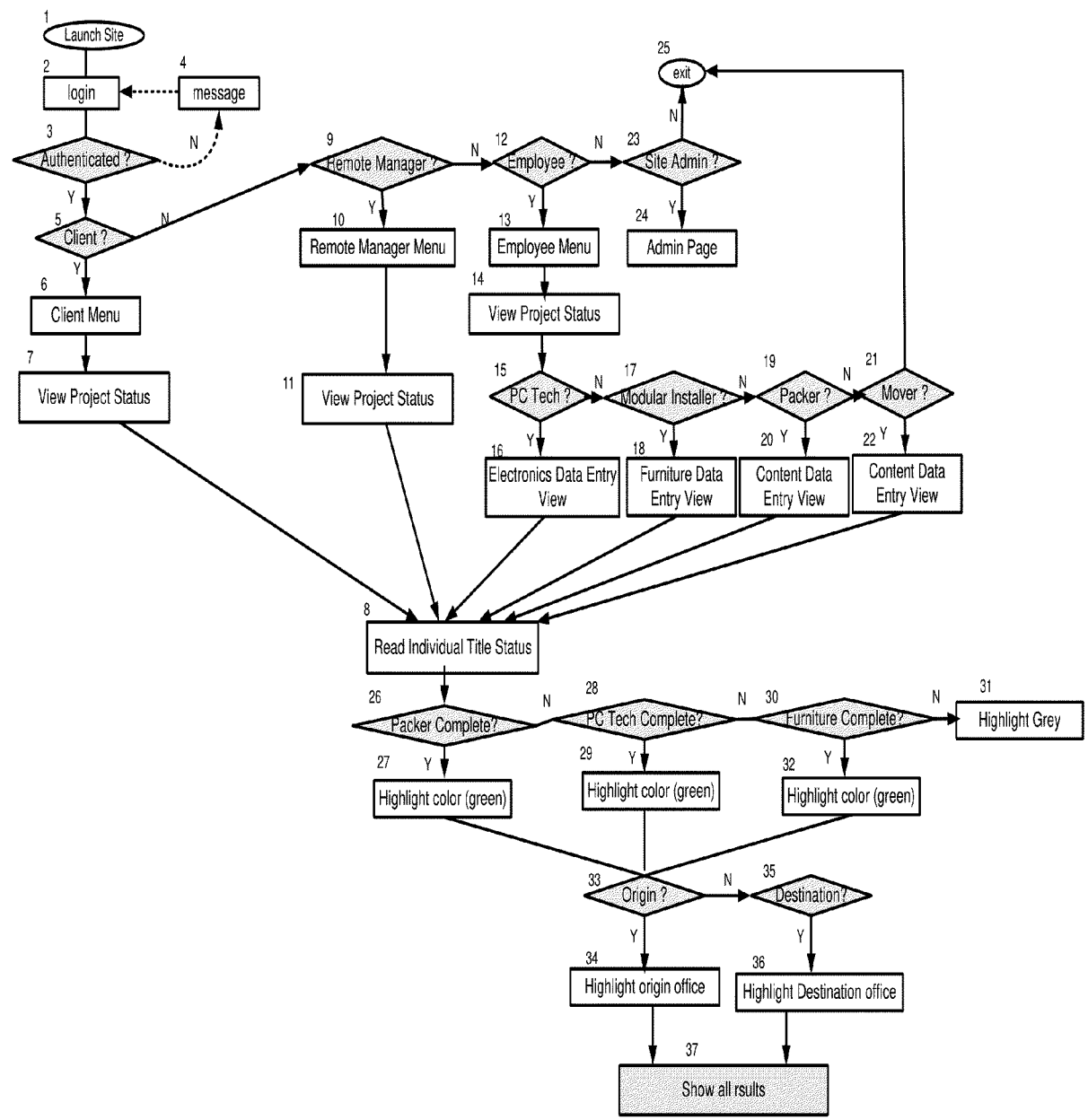

FIG. 22 relates to an algorithm for displaying and viewing office status and progress. Displaying and viewing of office status is by authentication based on user category and type comprising client, remote manager; and employees subdivided into type of pc tech, modular installer, packer, mover and site admin. The algorithm displays an interface for viewing project status and progress based on user type; and the user of type pc tech gets an interface for electronics data entry, and if the pc tech enters and saves data for an office, the office is highlighted to indicate completion of the electronics move whether it is the origin or destination office. All the other users get to view in real time that an office is completed or partially completed and if the office is not complete, it is by default highlighted with a color to indicate so. If the authenticated user is a modular installer, parker or mover, the user is provided with an interface for the respective title and the user does data entry whenever they complete an office. Saving data automatically highlights the office to indicate completion for the user type. All the other users get to view in real time that the particular title has completed a certain office at a certain time.

DETAILED DESCRIPTION OF THE INVENTION

FIG. 1A Involves launching an app on a mobile device or computer and displaying an interface with tabs wherein one tab labeled Login, displaying as a default interface with an application title or company title followed by a date. The interface also displays a dedicated window for announcements and ads from third party sources. It further displays a login text field and a password text field. These are followed by a keep me logged in check mark for maintaining a logon status. A submit button is labeled Log In. This is followed by a button link for resetting a forgotten password. The login tab also has a create account button link that invokes an algorithm to submit information to memory in a server to create a user account.

A second tab labeled contact is providing a contact form, phone numbers and emails for users to contact system administrators.

The last tab labed FAQ provides questions and correcsponding answers given by system administrators. It also provides a text area for submitting a question and instructions. Questions and answers are saved to a database or file system in memory of a server from where they are read and displayed on the FAQ page.

FIG. 1: The User Interface of FIG. 1 is displayed when a client launches their app on a mobile device or computer. During the move preparation phase, it allows them to enter the company to be moved so that the information can be accessed during the move phase.

When the client presses "Add Delete Internal Team Members (Co-Workers)", they automatically add those co-workers to the project communication team to which the client can add employees of a moving team. The project communication team is primarily an entity in the Comtool but in another implementation, it is built into the Move Tool.

To create a project team that involves workers of another group such as the moving company, the client presses the button link labeled "Generate Project Communication Team". This internally selects the project number, execution date and time and sends queries to the scheduling database to extract names of people scheduled to work on that project at that time.

That is, It selects all employees from the schedule where project number = project number provided and execution date = date and time = time. That returns all people scheduled to work on that particular project on that date and time. They are inserted into the Project Team Entity along with the internal employees to communicate on the project.

This gives those users ability to communicate on that team's communication group. The communication team lasts as long as the project is active. The communication is deleted at a specific time such as that after post move sign off.

The client utilizes the button links on the GUI to add the job which is composed of offices being moved and computers being moved. They further upload floor plans to enable movers view them on mobile devices to easily locate offices. They also upload pictures of computer setup to give computer technicians a feel for what a setup can look like.

Utilizing the GUI button links, the client prints office door labels and emergency move details in case there are connectivity problems during the move.

The system display completed and unfinished tasks at any given time. This provides users with ability to quickly see where they have to go to do the work without waiting for their supervisors. It creates a self dependency in the minds of the workers. This also enables the client being moved to know in real time what offices they can inspect and signoff in case of a moving company.

The button link labeled "View Move Progress" displays all offices that are completed with a highlighted color. The offices that are not completed are shown with a grey color to indicate that they need to be worked on.

Offices that are partially completed are indicated with two button links but with different colors. One button link shows the origin location and the other destination location. If the origin is completed but the destination is not, the origin is highlighted with a bright color such as green and the other is grayed out.

The Sign Off Project button link allows the client to rate the work and sign off as project completed. Finally, the Team Communication button link provides messaging service.

FIG. 2: The User Interface of FIG. 2 is used to add a company to be moved or edit a company that is already entered. That information is then used to populate other areas whenever needed. The company EIN may be a different identification as well.

The restriction selection menu provides a list of restrictions that a client can choose from to inform the scheduler what kind of workers shouldn't work on the project. If a company doesn't want certain type of employees to work on their project, this restriction is selected to filter employees. The filtered employees are written to a special entity accessed by the scheduler application not to include them on the schedule for that particular job.

FIG. 3: The user interface of FIG. 3 is utilized to add people that are to work on a project. These are co-workers of the client.

FIG. 4: The User Interface of FIG. 4 is utilized to add offices and people to be moved to the Move Tool software application. The user begins by selecting a company to be moved as seen in the dropdown menu. If that is the only job scheduled for that company, the company name, job number, state date and time of execution are displayed automatically. If the company has other scheduled jobs, the user selects the job number as well from another dropdown.

If a database is available with all names of people to be moved and all relevant information from a previous move, data is read into a file or data structure and uploaded to the entity origin. The previous destination information becomes the new origin information. The client doesn't have to re-enter all information each time.

To select the names, they provide the first few characters and the application software populates the fields.

If there is no data at all, the user then enters all the fields manually. Instructions for where to place the phone are provided with the letters that are marked as L or R in a blue color. A text area is provided for entering special instructions. When a computer technician reconnects the computer, the L for left and R for right shows up so he knows where to place the phone.

The system include a move priority to offices whenever there is a need. This variable which may be placed in the database or hardcoded is utilized to sort offices with the highest priority and display them on top with a specific color to indicate so.

FIG. 5: FIG. 5 accomplishes what FIG. 4 does in a slightly different manner. The radio buttons for priority could be checkboxes or any other selection mechanism. They are utilized to sort offices that need to be attended to in the order they are labeled. Selections are saved in the database of file and retrieved and sorted during display. High for the highest is color corded and displays to the top of the Move Status List. Low priority to the bottom. This allows movers to move offices that are to be back filled first.

FIG. 6: Adding Office to be moved and Office Computers and any other office items that needs documenting is adding a job. The User Interface (UI) of FIG. 6 is utilized by a client to add office computers to the software system during the preparation phase. It is also utilized by PC Techs to add office computers when there were no computers entered during the preparation phase.

The user enters the first few characters of the office number and gets a list of possible office numbers to choose from. Completing an office number displays the name of the office owner on the right.

The UI lists the names of the items to be accounted for on the left hand side and provides corresponding button links to select quantity of each item. The quantity may be zero, one, two or three. A selected value of quantity is listed in a different column for the user to know what they selected. It is also highlighted to emphasize. A delete button is provided at the end of the row to erase a wrong entry. However, the quantity button links labeled 0, 1 and 2 can be replaced with a drop down selection menu for items that need high numbers more than 3.

A comment text area is provided at the bottom to submit any problems encountered or comments. It comes with a submit button that sends the text to the database.

Not showed is the button for loading computer setup pictures. This allows the user to add pictures of the setup so that PC Techs can easily see what the client want the setup to look like when reconnecting.

At the bottom, a button link is provided to take the user back to the main menu.

FIG. 7: The User Interface of FIG. 7 is displayed when a client and remote manager presses on the button link labeled "View Move Progress" or something similar to that. It shows them the office number, its move color, name of the office owner and the office move status. To conserve space on a mobile device, the office number and move color are combined as seen in offices 435 and 436 respectively. That leaves only three columns to display data more clearly in bigger fonts.

The button link labeled "View Starts" allows the user to see statistical information that displays as a list of reports. This information depends on what kind of statistics the licensee wants.

Initially, all offices are displayed with two button links one saying "Dest-Open" and the other "Origin-Open".

When an office is completed at the originating office number and checked off by all the packers, pc techs and installers, the office part labeled "Origin-Open" converts to display "View Team" and highlighted for emphasis. The team means the crew that worked in that office.

When an office is completed both at the original office and the destination office, the button link labeled "Dest-Open" and the one for the origin are replaced with one button link that says "view Team" which is there to show people that worked in that office.

At any given time, launching this application shows the viewer what is completed so far and how much more to go.

At the end when everything is completed, all offices have one button link at the end highlighted and reading "View-Team".

The button link labeled "Communicate With Team" provides instant messaging communication with all people working on the project or job.

In the UI, the Move Color column is replaced with destination office for a quick reference.

The user interface is similar to the one viewed by the movers with minor adjustments.

When a job is completed, the software system provides a user interface that allows a client to rate the work and also enter comments. The client then uses their electronic signature if they have one to sign off the job. They can also sign off by virtue of their acct logon status.

FIG. 8: When a client hits the Rate Employee(s) or Sign Off button link from their main menu, the user interface of FIG. 8 is displayed. By default, it shows the job number, the date and time the job was performed and an option to change the job if a different job is to be signed off.

It provides a rating mechanism that allows a user to hit one round or rectangular (square) button rating from 0 to 5 stars. The number they choose highlights the star to show to the user what they selected. They can always change their mind before leaving the page.

A voter can give 0 to 5 stars each time. However, the average number of stars is displayed. The number of voters is displayed below or above the results.

The rating in this case applies to the entire team but it is also used to apply to an individual employee. This is followed by a comments section where the user can enter comments if they want to. The button in blue is a toggle button that allows the user to enter their electronic signature to sign off. Results of the rating can be displayed on any website of choice.

Under the "View Starts" button link in FIG. 7, a link to ratings is provided within the mobile app.

Figure 9:

FIG. 9: The User Interface (UI) of FIG. 9 is the default that shows when a PC Tech launches the Move Tool. To condense the space during development, columns one (Office) and two (Move color) are combined into one to have a total of three columns namely Office-Color, Name and Status. This makes the text bigger and more legible as seen in office numbers 435 and 436. However, the destination office number may be placed in the move color column.

Every office is represented by two buttons namely "Dest-Open" and "Origin-Open". The ones that are not completed yet displays on top.

When a PC Tech presses one of the two buttons to enter data, that is "Origin-Open" or "Dest-Open" they get a secondary menu that shows status of each of the PC Tech, Installer and Packer in regard to that particular office (FIG. 10). A PC Tech selects the PC Tech option and gets their data entry interface FIGS. 11 or 12.

When there is no data initially entered during the preparation phase, the PC Tech data entry interface displayed is represented by FIG. 11. However, when data is pre-entered into the software system during the preparation phase, the PC Tech gets the user interface of FIG. 12 which allows them only to confirm the displayed data.

Similarly, when the Packers and Installers select their options, they get their corresponding data entry interfaces (FIG. 13)

Upon entering computer data using interface 11 or 12, the button pressed say "Computer-Open" turns color to a bright one such as green to show that the computer in the origin office 434 is completed.

When a packer selects the packer option and confirms that packing is complete in that office, the packing part changes color just like that of the PC Tech. The same applies to installers.

When all the three confirms that they are finished with that office, the outer button labeled "Origin-Open" turns color. When it happens to the destination office too, the two buttons are replaced by one green button that says "View Team" to indicate the entire office move is complete for that particular office. If necessary, a button link for movers enables movers to indicate that they transported all the office content to the new office.

Data entry by the movers is saved in the entities Origin for the originating office data and Destination for the data pertaining to the end office. Though it could be saved in one entity and distinguished by origin and destination flags.

Packers, Installers and Movers use similar interfaces except that they just press a button to confirm completion of their activities instead of entering computer data. They get the interface for data entry upon pressing the grey buttons.

PC Techs also gets the other data entry interface when they press the button link located on top of their menu labeled "More Data Entry". Here they get access to the two options namely Add Team Mates and View Team Mates in addition to Packing and Moving which everybody has access to.

In the user interface for showing Move Status, FIG. 9, the move color column is replaced with the destination office number but may be hidden until the user touches the origin office number. In one implementation, the destination column number slides into place after a touch. It all depends on screen size and font size.

FIG. 10: This User Interface displays when a user selects one of the two buttons in FIG. 9 named "Origin-Open" or "Dest-Open" to do data entry for their respective profession. If they are Packers, they select the first option Packing and this opens them a new user interface 13 for entering office content packing information from that particular office.

If they are PC Techs, they select the PC Tech option and that gives them one of the two PC Tech user interfaces 11 or 12 depending on whether data was pre-entered or not.

If they are Installers, they select the installer option labeled Furniture and gets the installer user interface for confirming completion of furniture in that particular office.

The UI also displays completed individual parts such as Packing, PC Tech or Modular Installation for viewing individual parts that are completed in that office.

FIG. 11: The User Interface of FIG. 11 is used by computer technicians to record data when the client being moved did not enter the data in advance. The top line shows whether the UI is for Origin Office data entry or Destination.

The text field labeled "Enter Office Number" allows the user to enter office number with auto complete. This pulls up the name of the person in that office and displays it in the next text field or space labeled "Name Auto Fills".

Note however that the field labeled enter office # does not need entering the office number because it is read automatically from the first selection of that office in FIG. 9.

When selected, the buttons labeled 0, 1, or 2 submits the corresponding number to the database to be saved as the selection for the quantity of the item listed on the left. The quantity saved also displays in the column next to the number 2 button. It gets highlighted with a color such as green when it is greater than zero (0). The last button on the right labeled "Delete" allows the user to delete accidental data entry line by line.

Comments are entered in the text area at the bottom and submitted using the button labeled "Submit Comments".

In another implementation, the buttons labeled 0, 1, 2 and 3 are replaced by a dropdown menu from which the user selects a 1, 2, 3 or a different number.

In summary, data entry from this UI confirms that the office is now completed for the computer part. The display that shows completed pieces one by one (FIG. 10) shows computer highlighted as completed. If packing /unpacking and furniture happen to be completed, then the entire button for either origin office or destination office is highlighted to show that the office is completed.

In the initial implementation, packers and furniture installers only press a button to show that their part is completed. The button links are not showed here to shorted the application. If a need arises for recording furniture in detail, each furniture piece is then recorded in the same manner as computers. Similarly, there is no need at this point to record items being moved. If that need arises, the movers also record whatever they transport in the same manner.

FIG. 12: The User Interface of FIG. 12 displays when a PC Tech selects an office button to do data entry on a computer and computer data happens to be pre-entered at the preparation phase. As the user confirms quantity using a touch button, the quantity displays on the right hand side. The last column allows editing quantity in case something is not right.

Though the top field says enter office number, there is no need for that. The office number and office owner name displays automatically after choosing the office number displayed on the initial progress screen in FIG. 9. It is saved as a variable.

FIG. 13: The User Interface of FIG. 13 is a one button touch confirmation data entry UI. A user just touches a button to inform that their part is completed. Once they do, the button representing their title changes color to green or other to indicate completion.

Packers and Movers use the same User Interface without the Installer option. A PC Tech can open the Packer or Mover menu and access the Add Office Teammates or View Office Teammates button links. A user that is an installer and a PC Tech as well gets access to all the four menus options. Such a user is referred to as a key user. A supervisor may be assigned key user privileges if the company wants them to have it.

If a user is titled supervisor or manager, they get an extra button link that allows them to generate a team communication group for the job just like a client or remote manager. In addition, they have key user status where they can do data entry for any user group that is, PC Tech, Installer, Packer and Mover. Their user id is registered for any data entry they do.

FIG. 14: The graphical user interface of FIG. 14 displays when a packer or installer selects add team member to records. It provides names from the employee entity scheduled on that job and displays them for the user to choose from. When a name is selected from the left hand side, the arrow in the middle pushes it to the right hand side and vice versa. The submit button saves the group of users that worked in the particular office to either the origin or destination entity from where all users can view the completed work.

Alternatively, auto complete is used. In this case, a list of names is provided either in an array or directly from the server as variables. The application takes the first few characters typed and searches from the names provided to return a list of possible names. The user selects from these and inserts into the team member (Packer, Installer or mover) group.

A button is added to the main interface for adding team members in a given office and another for viewing them in case there is a question about anything in that particular office.

FIG. 15: FIG. 15 is a representation of a user interface displayed to show team members that worked in on office by title. It provides their names and option to call in case there is a question about that particular office.

FIG. 16: The User Interface of FIG. 16 displays when a moving company manager logs onto the application. They can view move progress or status on all jobs running that day by selecting the job number. They can generate a project communication team as well for any project in case none is generated. On duty supervisors may use a similar menu.

FIG. 17: The diagram of FIG. 17 is the Entity Relationship Model that determines the database system of the software system. The entities Schedule, Project (Job), projectStatus and Messaging have been included here for use if the Move Tool runs as an independent application. In such a case, the Entity Employees is utilized as a source for instant messaging users. Otherwise the Move Tool pulls scheduling information from the entities Schedule and Employee in the scheduler application. In that case, the those entities are not utilized.

Additionally, the entity Movers is added just in case it is necessary to track team members that moved items from one location to another.

The entity Employee represents workers such as those of the moving company. They move offices or office owners (represented as entity Office). This is considered to be the job being done.

Data stored in the entity Office (OfficeOwner) is the same data that would go into the entity Project (Job).

The four groups of employees that move offices works on items represented by the entities (a) Office Furniture, (b) Office Content, (c) Computer and (d) Movers. All these entities are colored grey to distinguish them from others. When moving, data is stored by each of the titles in their respective entities (a)—(d). The data includes two parts origin and destination. To utilize the data, the application queries all the four entities each time.

The many-to-many relationship between the entity Employee and Furniture generates a title entity named Installers and the relationship between Employees and Office Contents generates a title entity named Packers. Similarly, the entity Movers is generated. The resultant entities are utilized to store activity data instead of the container entities.

However, for a more efficient database system, the entities generated are replaced by only two entities to store activity data. These entities are namely Origin for storing data pertaining to work at the originating site and Destination for storing data for the location where items are being moved to. These two entities are a result of the entities Employee and Office as seen in the ER-Model. They both store employee ID and office number to track all employees that move the named office.

In another implementation, the two entities Origin and Destination are combined into one and data distinguished by origin and destination flags.

The entity Company Moved represents the client company which owns the offices. It's ID is inserted into the entity Office for identification of the company being moved in every record.

The entities Employer and Client adds employees to the Comtool or local messaging service for communication so their ID is inserted into the employee entity for tracking who added that employee to the Comtool.

These two entities also view job progress on the entity Office. This generates a new entity Views with ID of the three entities Employer, Client and Office. This entity tracks every activity carried out by those three entities.

FIG. 18: FIG. 18 represents the database schema used in the RDBMS of the software system of the Move Tool. It is based on the Entity Relationship Model (ER-Model) displayed earlier.

The entity Electronics also known as Computer, stores data about all the parts that are related to a computer used in an office setting or a server that needs to be moved. To record computer related items moved, they are recorded in this entity. The office number from which the computer comes or the computer ID is used along with the PC Tech ID as a composite key, to record and identify a transaction.

Similarly, move data related to furniture and modular installers is stored in the entity Installers and move data related to the office contents is stored in the entity Packers. Both of these move activity entities utilize the employee id and office id to create records. Move records regarding all items moved and the moving crew are stored in the entity Movers.

All the above entities store data for both the originating office and the destination office. Queries are submitted to these entities to return any needed information about the move.

In another implementation, these four entities are replaced by two entities that results from the many-to-many relationships of the Employee entity and Office entity. One of the two entities named Origin store move activity data from the originating office and the other named Destination store move activity data from the Destination office. They both utilized the Employee Id and Office id to generate a record. The two entities store all the move activity related data that is stored by the entities Computer, Installers, Packers and Movers.

When each of the individual mover titles PC Tech, Installer, Packer and Mover finish their part, they record the status of that part in the entity Origin for the originating office and Destination for the destination office. Upon completion, color of that particular move part changes to indicate the completion of the activity.

Origin and Destination entities: When the individual titles are all completed and their statuses marked completed, they each get highlighted under the individual office status interface. When they are all highlighted, the final office origin field visible to all is highlighted to show the entire office is complete. The same applies to the destination status.

The two entities Origin and Destination are further compressed into one entity to store both origin and destination data. In this case, data is flagged as for origin or destination.

Either way, an attribute not shown, inserts a feature that allows a client to confirm every room as complete at the destination office. That is approval per room or walk through check off.

Under the entity OfficeOwner, the move priority code enables the software to sort the people to be moved accordingly. If they have a high priority, they are placed on top and highlighted and the ones with a low priority are at the bottom with a different color to distinguish them. The client or supervisor can change the priority colors at any time.

The entity WeightedIndex stores all the items moved and their given weight or value which determines how long it takes to move or process that item in the originating office and re-assembling it. This includes time for transporting the item through a given distance and loading it to a truck if it is loaded. The index estimates percentage completion of the job and how much longer it could take to finish the entire job.

Not showed is an entity CurrrentOffice. This entity is utilized to store data coped from the entity Destination. It becomes the new origin entity when those office owners move again. It stores current office locations of all workers in that company and used to populate other entities.

The Authentication entity which contains title of the users is used by a software module to load the correct menu of a user based on their title. However, the title attribute can be placed in any other entity. The attribute company Id identifies the company from which the user comes and the app version attribute identifies the user's application version.

The entity Office stores all information about an office to be moved. This includes office number, owner names and contacts, job number, move date and time, originating office and destination office info, any special instructions for the particular office and other attributes.

Other entities included are used to store information based on the attributes as shown.

FIG. 19: A client launches the app 1 and logs in 2. If not authenticated at step 3, the get an error message 4 and taken back to the login. If they happen to be authenticated 5 and identified as client, a client menu 7 is displayed. The client menu is divided into Prep phase, Move phase and Post move phase. If the client selects an option from the Prep phase 8, they add company to be moved 9, add-edit or delete internal team members (co-workers) that are supposed to work on the project 10. Adding co-workers places them in the Project Team Member entity which is part of the Comtool utilized to communicate by instant messaging.

They are also added to the Move Tool to be able to view the move process. These users are either pulled from the entity Clients using SQL Queries or added manually via a graphical user interface one at a time.

If a client or their co-worker choose to add an office to be moved 11, a user interface 12 is displayed to add the office and office owner. At step 13, they can edit the office entry. The client or their designee assigns a move priority 14 which enables sorting of the offices in case some need to be back filled and moved before others. They also set color of the move 14b to easily identify offices at the destination by looking in their device.

If they choose to add a computer or some other electronic such as a server 15, a graphical user interface (GUI) is displayed for entering the data by touch buttons or selection menus 16. Utilizing the touch buttons and selection menus, they enter the computer data 17 and submits it to save in the database 18.

If the client decides to print move details for emergency system outage 19, they print the details 20 and exits 21.

If they choose to print door labels 22, they get the option for printing the labels 23 and exits 21.

If at step 15 they did not want to add PC or server to be moved but to upload floor plans 24, they would get a button to load files to the database 25.

If at step 8 the choice was from a move phase 26, the client generates a Project Communication Team that adds scheduled employees to work on the project from the external company (moving company) 27. With a single button press, a software module submits queries to scheduled employees entity.

If not added, the client adds movers (scheduled moving company employees) to the Move Tool and Comtool to communicate. Whoever adds the user, their ID is registered in the ProjectTeamMember entity of the com tool. The Move Tool application queries the Scheduler application with statements such as

```
SELECT userID, firstName, lastName
FROM tblEmployees
WHERE tblEmployees.userID = tblSchedule.userID and
tblSchedule.projectID = tblProjects.projectID
ORDER BY firstName;
```

In a one button click, this selects all scheduled employees on that particular project selected by project ID, date and time of execution. It inserts the selected people into a data structure or file which is utilized by a software module to insert the records into the Employee entity in the Move Tool and the projectTeamMember entity in the Comtool.

The client can choose to view move status or progress 28 or communicate with the Project Team 29.

When the project is completed, referred to as post move 30, the client is provided with an option to approve the work done 31 or submit comments for a rework 32. If the work is good, the client is provided with a rating 33 that issues 0 to 5 stars by pressing a number in a circular or rectangular (square) button. However, the average of the rating is displayed. The number of the voters is also displayed to give a better picture of the votes. If there is a final payment to make, the user is provided with a payment button they press to open a payment form 34. After all is done, a module automatically deletes the communications on that project 34b. This deletion module is configured with a preset time after the project and the time is editable.

If at step 5 it was not a client logging in and not a remote manager 35, another algorithm such as that of moving company employees would be executed 36. If it is a remote manager at step 35, a remote manager menu 37 is displayed.

The remote manager or supervisor can view Move Status 38 and generate a Project Communication Team 39.

FIG. 20: The algorithm of FIG. 20 is a supplement to that of FIG. 19. Authentication of a user on the move tool activates this algorithm 1. When the client presses "Add Delete Internal Team Members (Co-Workers)", they automatically add those co-workers to the project communication team.

To create a project team that involves workers of another group such as the moving company, the client presses the button link labeled "Generate Project Communication Team".

This internally selects the project number, execution date and time and sends queries to the database to extract names of people scheduled to work on that project at that time.

That is, it selects all employees from the schedule where project number = project number provided and execution date = date and time = time. That returns all people scheduled to work on that particular project on that date and time. They are inserted into the Project Team Entity along with the internal employees to communicate on the project.

This gives those users ability to communicate on that team's communication group. The communication team lasts as long as the project is active.

If user is a client and works on multiple jobs or the user is a remote moving company manger, they get a user interface that allows them to select a job from a dropdown menu before generating the Project Communication Team for a particular group.

If the user is a client with only one job, the job is selected by default with authentication 2.

In a two step process (prep or preparation phase) and (move phase), the client adds users to the communication module of the move tool. During the prep phase 3, the client presses a button labeled "Add Internal Team Members (Coworkers)" from their main UI. This button invokes step 4 in this algorithm and adds those people to work on the job to the communication module. A UI for adding them is provided. Alternatively, they are read in from a file or database.

If it is a move phase 5, the client presses a button link labeled "Generate the Project Communication Team" and it invokes the rest of the algorithm. It takes the job number, execution date and time and submits a query to the scheduled employees entity. The query returns employees that are scheduled to work on that project at that time 6.

The employees are then inserted into the communication team entity (ProjectTeamMembers) 7 for the selected job.

Once saved in the database, the two groups merge automatically 8. The communication team 9 is now generated. All participants can now communicate by instant messaging 10.

FIG. 21: The algorithm of FIG. 21 is utilized to enter moving company data so that a move progress is visible to all parties involved and streamline the process. Steps 1 through 4 authenticates the user. If the user is not employee 5, a different algorithm 6 is executed. Else if the user is an employee of a moving or similar company, the main menu displaying the move status is displayed. This menu contains the original office number, the destination office number, move color, name of the person being moved and status of the office indicated by a color.

The move is divided into two buttons one indicating the originating office and the other the destination office. If the phase is origin, a button for data entry indicates so and the other button indicates data entry for origin and current status.

Given the mover title at logon and what they are entitled to access, when they press the origin button 7, they get another interface that allows them to confirm completion of their section of the work. The secondary interface 8 has buttons each indicating the title that a worker presses to confirm that they have finished their work. This interface is represented by FIG. 13. The user selects a data entry button corresponding to their title 9 to enter data.

If the user is a PC Technician 10 at the originating office, the algorithm looks to see if disconnect move data is pre-entered 11. If it finds it finds that data was not entered prior to the move 12, a multi-selection graphical user interface is displayed to enter the data. If the algorithm finds that disconnect data was entered prior to the move phase 13, a different kind of graphical user interface is displayed only to confirm the pre-entered data. In both GUI's, data is entered using either touch buttons or selection menu to prevent user data entry errors 14. Once computer disconnect data is entered and saved into the entity Origin in database 15, the button for computer is highlighted to change color to indicate completion of the computer part of the move (disconnections).

If there are any issues regarding the computer disconnects 16, the technician records the issues and if they have any pictures related to the issues, they can post those pictures to the database as well 17.

If there are no issues and the mobile device is connected to the network 18, data is saved to the entity Origin to in anticipation of data saving from the other titles 18b.

If at step 10, the title was not PC Tech but installer 21, the installer UI is displayed 22 for the installer to confirm completion of their part. The installer button on FIG. 13 is highlighted to show completion of furniture disassembly 23. If the title was packer instead 24, the packer would press their button 25 to confirm completion of content packing. The packing button is then highlighted to indicate completion of that section of the work 26. If the title was Mover instead 27, a mover presses the Mover button 28 to confirm completion of moving that office and the button is highlighted 29.

If there are any issues for installers, packers or movers, 16, the issues are documented 17 and saved to the database with any pictures if available.

If there are no issues and all devices are connected to the network 18, all the data is saved in the Origin entity in the data base 18b. The origin main or external button for that entire office is highlighted to indicate that the office is completed 19. This is communicated to all the team working on the project to view status 20 and communicate where necessary.

However, if at step 18 a device has no network connectivity, data is saved in the local device storage 45. This storage could be a mini database or browser based storage. The device then connects to the network 46, and synchronizes data with the server 47.

If at stage 7, the button pressed from the main mover interface is for the destination office 30, the process is repeated as showed diagrammatically except that data is saved to the entity Destination in the database instead of the entity Origin.

The entity Origin is queried for moving information on the originating office and the entity Destination is queried for information regarding the office to which the move ends.

FIG. 22: The algorithm of FIG. 22 enables authenticated users to view office move status and job progress. Steps 1 through 4 authenticates the user. The algorithm reads user titles and decides what interface to display for them. If the user is a client 5, a client menu is displayed 6. This menu has many options one of which is the View Project Status 7. Upon pressing this option, the client gets a UI that shows a listing of offices and their statuses.

The status is represented by two buttons one for the origin and the other for the destination. These allow the client or any user to view individual office status 8. The default button color grey on one of these two buttons shows that the office is not complete yet.

If at step 5 the authenticated user is not a client but a remote manager 9, they get a remote manager menu 10 which provides an option for viewing Project Status 11.

If the authenticated user happens not to be a remote manager but a moving company employee 12, the employee menu 13 is displayed. The employee menu is the same as View Project Status 14 except that it has tabs to indicate each mover category. That is, Packer, PC Tech, Installer and Mover.

To view the individual section of an office based on the above titles, the user touches the "origin" button or "destination" button to open a new interface. If the user is a PC Tech 15, they see their Electronics or Computer Data Entry button color 16 along with the others. If the user is a Modular Installer 17, they view their installer or furniture button 18 along with the other titles. If the user is a Packer 19, they view content pack data 20 along with others. Likewise, a Mover 21 gets to view mover entry data 22 along with the other titles.

All the titles at this point read the individual title status. To display statuses, the algorithm reads the individual title status for each title of the moving company. That is, PC Tech, Modular Installer, Packer and Mover and 8. If the packer section is completed 26, the packer button is highlighted from grey to a different color such as green 27. If the pc tech section is completed 28, the pc tech button 29 is highlighted to indicate it is complete. If the furniture section is not complete 30, the furniture button 31 remains with the default grey color. Else if the furniture section is complete 30, the furniture button is highlighted with green to indicate it is complete 32.

If all the three Packer, PC Tech and Installer (furniture) are completed, the external office button on the main Office Move Status button is highlighted green or some color to indicate it is complete.

If the data is read from the entity Origin 33, the origin button 34 is highlighted. If the data is read from the entity Destination 35, it is the destination button 36 on the outer office that is highlighted. Results 37 are viewed by all authenticated users at this point.

Co-Existence With Other Apps: The Move Tool works in conjunction with a scheduler to obtain names of scheduled employees to be part of the project communication team. It also works with the Comtool software systems which is the actual communication software.

In another implementation, the projects entity is built into the Move Tool and users (project team members) are added from within the Move Tool. That makes the Move Tool an independent product.

The messaging software application enables a project team to communicate even when the team is composed of two or more groups of people that are different. The client internal staff that works on the project and the employees of the company hired to do the actual work. This company may be a moving company or other type.

The project communication team is a temporary team that lasts only up to the end of the project but the users retain the ability to communicate in general and on other project teams. After a set time, communications from a project team are automatically deleted.

Mobile App Version Control: A variable is declared to store the application version. This variable may exist as a variable within the code, in a local file or on a resident mini database. When a new version of the application comes up, the application reads the version in the variable and compares it to the new version. If the version is older, the user is prompted to update their app. Alternatively, the application automatically updates the app.

In another implementation, the application stores the user's app version along with the login data in the database. When a new version of the app come up, the user is periodically informed to update. The application can as well update the mobile up user's app automatically. Under both implementations, the server side application can prevent a user from authenticating if they have an old version of the mobile app. Version control is included in all our apps.

What is claimed:

1. A move tool system for electronically tracking and coordinating commercial office moves via a mobile phone app comprising:
a processor; and
memory coupled to the processor, the memory storing instructions executable by the system to cause the system to perform operations comprising:
linking database entities in a database stored in the memory of a server, wherein an authentication entity containing titles of users, utilized by a software module to link the entities and load a correct menu of a user based on the user title, and wherein the user title generating user types of a pc tech, a modular installer, a mover, a packer, a supervisor, a remote manager and a client;
authenticating a user and launching a menu interface corresponding to a user category or type, wherein the user of category client, getting a client menu interface with button links comprising Add Company To Be Moved, Add-Delete Internal Members (Co-Workers), Add-Edit Offices To Be Moved, Add _Edit Office Computers, Upload Floor Plans, Print Door Labels, Print Move Details for Emergency Outage, Generate Project Communication Team, View Move Progress, Sign Off Project and Rate Employees, and Team Communication, wherein pressing each of the button links displays a new interface that accomplishes tasks designated for the button link, and a submit button on the interface, interacting with a plurality of algorithms to transmit instructions to the processor and saving, processing or retrieving data from the database in memory of the server;
executing an algorithm for client data processing and authenticating the client to the client menu interface to perform tasks in a prep phase, a move phase and a post move phase, wherein the prep phase tasks includes adding a company to be moved, adding team members to work on a project team, adding an office and an office owner to be moved, adding computers to be moved utilizing touch buttons or selection menus on the interface, uploading floor plans, and assigning and editing an office move priority, wherein the office move priority is assigned by specifying a move color for specific offices for movers to identify the priorities so as to start with the highest priority colors when moving offices;
executing an algorithm for adding members to a project communication team, wherein the algorithm testing for the prep phase and adding a group of internal team members or co-workers scheduled to work on a project, to a project communication team entity for a job to be executed, wherein the algorithm selecting a job or a project number, date and time of execution, and submitting a query to a mover scheduling database to obtain employees scheduled for the project, and the algorithm inserting the moving employees group into the project communication team entity, wherein pressing the generate project communication team button link on the menu interface, displays all users in the project communication team;
authenticating a user on a mobile device or computer and tracking progress of a commercial moving project utilizing a plurality of interfaces with button links that when pressed, invokes an algorithm for displaying and viewing office status based on a user category and type, wherein the user categories and types include a client, a remote manager, and employees of type pc tech, modular installer, packer, mover and site admin, and wherein the user of type pc tech getting an interface for electronics data entry, and if the pc tech entering and saving data to indicate that electronics in an office are completed, the office is highlighted in a color to indicate completion of electronics in the office making the completion visible to all users of the system in real time, and when packers, installers, and movers save completion data, the office is highlighted to indicate completion of all parts moved, wherein all system users view a completed or a partially completed office in real time and if nothing is completed in an office, the office is by default highlighted with a different color to indicate the office status;
showing an office move status by two color coded buttons on an interface for each employee type, one button being for a origin office and labeled Origin-Open to mean the origin office is not complete, and another button for a destination office and labeled Destination-Open to mean the destination is not complete, wherein the moving company employees namely the pc techs, the installers, the movers and the packers, completing the origin office and saving data, and wherein data auto highlighting the origin button with a color to indicate status of completion, and completing the destination office and saving completion data auto highlighting the button with a color to indicate completion status on the destination office, wherein the completing and recording of the origin office and destination office in the system changes the two buttons to one button showing teams of employees that worked in the completed office and the button is labeled View-Team, and wherein pressing the view-team button link, displays the moving employees that worked in the office;

executing an algorithm for controlling moving company employee data entry, wherein the algorithm relating to a user with an account entering email or phone number and a password, and testing for the user category and authenticating the user, wherein the algorithm determining the authenticated user data entry as being for an origin office or a destination office, and displaying an interface corresponding to the user category and user type providing button links with data pre-entered into the database during a preparation or prep phase and loaded to the mobile devices application touch buttons during a execution phase, wherein move data is entered into the database or file system utilizing the touch buttons with pre-entered data or multi-selection graphical user interfaces to prevent data entry errors, and wherein the system recording user id of the employee doing data entry and id of the office linking the office moved to employees that moved said office;

changing user account information including email and phone number utilizing a button link in a move tool system for electronically tracking and coordinating commercial office moves, wherein hitting the button link opens an interface with text fields and a submit button for changing email, phone number and other personal data, and hitting the submit button saves changes to memory on the server; and authenticating the user in the move tool system for electronically tracking and coordinating commercial office moves, wherein the user is authenticated to an interface for transmitting data related to the user title, and wherein data is recorded to an RDBMS, file system or other non-relational databases on the server and viewed in real time by all users of the system.

2. The system of claim 1 wherein the algorithm that processes client data entry in conjunction with the authentication entity, authenticates a user to load a correct menu of the user based on title, wherein an attribute company Id that identifies a company from which the user comes, displays a client menu for the company on a mobile device or a computer wherein the client menu is divided into the prep phase under which users upload move data to the server including floor plans and computer setup pictures, the move phase from which the client monitors the move progress and the post move phase from which the client inspect the offices and signs off a job, and wherein office based users enter data via computer or mobile devices into the data storage on the server and the mobile app retrieves the office moving data and track moving activity.

3. The system of claim 1 wherein the interface for tracking project progress changes status button links and colors based on data entered by the PC Techs, the Installers, the Packers and the Movers.

4. The system of claim 1 wherein the algorithm utilized to add members to the project communication team is invoked by a button link in an interface to send queries to the database on the server to extract scheduled moving employees and client company employees scheduled to work on a project wherein the extraction takes place by project number, user id, and execution date and time, merging the two groups into one project team to communicate by instant messaging and phone interaction, wherein the system providing an interface for displaying names to call on mobile devices.

5. The system of claim 1 wherein the algorithm for controlling moving company employee data entry in conjunction with the authentication entity, authenticates a user on a mobile device and displays an interface for tracking project progress for users of type PC Tech, Installer, Mover and Packer, wherein the user records moving data to the server and record any issues that arise, uploading related pictures for management's use, wherein saving data automatically highlights the office involved and avails the information to all users.

6. The system of claim 5 wherein the algorithm provides data entry access for the PC Tech to a PC Tech interface, for the Installer to a installer interface, for the Mover to a Mover interface, and for the Packer to a Packer interface, wherein the interfaces display by user type at login, and user titles are configured to have data entry access to more than one interface, wherein the user id of the employee is recorded in the database in memory to indicate who entered the data.

7. The system of claim 6 wherein the algorithm tests for a network connectivity, wherein the algorithm saves data to a local device storage when there is no network connectivity and synchronizes with the server when the device is connected.

8. The system of claim 5 wherein the authenticated user of type Installer gets an installer UI to confirm completion of furniture disassembly at the origin office by pressing the Installer button link, and if the authenticated user is of type Packer, a packer presses the packer button link on the UI to confirm completion of content packing in said office number; and if the installer, pc tech and packer are all completed at the origin and presses the respective completion buttons, the origin-open button link is highlighted for the movers to move the office, wherein the authenticated user of type mover presses the mover button on the UI to indicated that the origin office is moved; indicating to the Installers and PC Techs at the destination office that the office is ready to reassemble, wherein the Installer and PC Tech respectively presses button links to indicate office completion at the destination office and the two status buttons are replaced by one button labeled view Team.

9. The system of claim 3 wherein the algorithm for displaying and viewing office status and progress, displays project status during a moving project, and project status is visible to all employees on the project and remote management for the remote managers to supervise moving jobs remotely, wherein the mobile interface interacts with data on the server displaying the move status and showing a origin office number, a destination office number, a move color, name of the person being moved and status of the office indicated by a specific color, wherein pressing a button link labeled O-View Team, invokes the algorithm to interact with data in memory of the server and display employee teams that worked in the completed office.

10. A computer-implemented method for electronically tracking and coordinating commercial office moves via a mobile phone app comprising:

launching an application on a mobile device or computer; getting authenticated and identified by a user category or a user type; and displaying a menu corresponding to the user category or user type, wherein the user of category client getting a menu interface with button links including Add Company To Be Moved, and opening the button link, displays a new interface utilized to enter a company to be moved so that the company information is accessed during the move phase, wherein the information includes selecting from a list of restrictions and saving the selections to memory of the server to inform a scheduler what kind of employees shouldn't work on a project, wherein the employees are filtered and written to a special entity in a database during scheduling;

the menu interface displaying another button link named Add-Delete Internal Team Members, and pressing the button link, displays another interface utilized to add or delete co-workers to the project communication team;

the menu interface displaying another button link named Add - Edit Offices To Be Moved and choosing to add an office to be moved displays a user interface to add the office and office owner details, wherein editing office entry and assigning a move priority variable for sorting of the offices that need to be moved before others, and wherein setting color of the office move to identify the office priority;

the menu interface displaying another button link named Add-Edit Office Computers to be moved, wherein choosing to add a computer or a server displays a GUI for entering computer data utilizing touch buttons or selection menus and submitting to save to the database or file in memory of the server;

the menu interface displaying another button link named Upload Floor Plans, wherein the button link displays an interface utilized to upload floor plans for locating offices and pictures of computer setups that gives computer technicians knowledge of the computer desk setup for reconnection;

the menu interface displaying another button link named Generate Project Communication Team utilized by supervisors, managers and clients, wherein pressing the button link sends instructions to the processor and internally selects a project number, a execution date and time and sends queries to the scheduling database to extract names of people scheduled to work on the project at that time and the moving company employees are inserted into a data structure or file utilized in a software module; and inserted into a project team entity in the database along with other employees to generate a team communication group specific to the project and saves the team communication group to memory of the server;

the menu interface displaying another button link named View Move Progress, wherein pressing the button link transmits instructions to the processor to read data saved in memory of the server and opens a new interface displaying all offices that are completed with a highlighted color, and uncompleted offices are displayed with a color that indicates that the offices need to be worked on, wherein the algorithm for displaying and viewing office status and progress, displays in real time what offices needs to be worked on and what offices to inspect and sign off;

the menu interface displaying another button link named Sign Off Project wherein pressing the button link displays an interface showing a current job number, date and time the job was performed and a job selection, wherein the interface having a current job number, comes with a rating mechanism for rating performance of a team or an individual employee;

the menu interface displaying another button link labeled team communication wherein pressing the button link, displays another interface for providing instant messaging communication and phone interactions between the client company, pc techs, installers, parkers, movers and any other group working on a project.

11. The method of claim 10 wherein the algorithm for controlling moving company employee data entry, authenticates a user of category employee on a mobile device displaying a menu interface with tabs for users of type Packers, PC Techs, Installers and Movers on a mobile phone app for data entry, wherein the interface displays button links, including a More Data Entry button link for entering commercial moving data to a database or file system on the server, wherein the button links invoke the algorithm to send instructions to the processor, record data, and electronically track and link offices moved to employees that move the offices, and office owners.

12. The method of claim 11 wherein the More Data Entry button link on the interface, invoking the algorithm and transmitting instructions to the processor, opens another data driven interface that reads the database for data, and generate buttons embedded with the data pre-entered into the database at the preparation phase or at the origin office, wherein the user type of PC Techs, Installers, Packers and Movers limit data entry errors by touching the button links embedded with data on the mobile app confirming the data displayed in or near the button links.

13. The method of claim 11 wherein the menu interface with tabs for users of type Packers, PC Techs, Installers and Movers, invokes the algorithm transmitting instructions to the processor, and displaying a new interface with origin buttons and destination buttons, wherein the buttons on the new interface include Packing, Computer and Furniture, each displays a corresponding interface for data entry, for completed offices;

pressing a button to record a completed office changes color of the button to a different color, wherein the UI displays completed individual parts for Packers, PC Techs, Modular Installers and Movers, and wherein the move progress is viewed in real time.

14. The method of claim 10 wherein the algorithm for displaying and viewing office status, wherein the algorithm authenticating and reading user titles at login, decides what interface to display for the user, wherein the move priority variable is utilized for sorting offices with the highest priority; wherein the algorithm displaying prioritized offices on top with a specific color to indicate the priority in a mobile phone app linked to the database or file system on the server, and wherein the project status is displayed in form of button links and opening a button link labeled View Team, displays teams that worked on the completed origin and destination offices.

15. The method of claim 10 wherein the rating mechanism for rating employees and teams of employees in the computer-implemented method for electronically tracking and coordinating commercial office moves via a mobile phone app, implements a user interface with button links that invokes the algorithm for client data processing submitting rating data to a database on the server in the post move phase, wherein the rating interface provides a comments section for entering comments and rating results are displayed to any website of choice.

16. A method of architecting data for electronically tracking and coordinating commercial office moves comprising:

determining relationships between entities to generate an ER-Model for determining a database schema, wherein the entities and the entity relationships collectively determines the database schema and attributes of the entities in the database schema;

relating an entity Employee to an entity Office by a many-to-many relationship generating an entity Origin and an entity Destination for storing and retrieving origin and destination move activity data;

relating an entity Client to an entity Office by a many-to-many relationship generating an entity views for linking the client to offices and viewing activity data, wherein the activity data is stored in at least one entity and viewed by clients and employees on a project;

relating an entity Computer or Electronics with attributes as listed in the database schema storing computer data, server data and other electronics data, to an entity Office Furniture with attributes as listed in the database schema storing furniture information, and to an entity Office Content with attributes as listed in the database schema storing office content data besides electronics and furniture, wherein the at least one entity with any name storing electronics, furniture and office contents relating to a commercial office move;

installing the database schema in memory of the server to store data for electronically tracking and coordinating commercial office moves, wherein submit buttons on interfaces interact with a plurality of algorithms to transmit instructions to the processor for saving, processing or retrieving data from the database or file in memory of the server;

storing user registration and authentication data and the data attributes including userId, first name, last name, current email, phone number, password, company Id, title and notes in the database or file system, wherein the entities Authentication, Users, Client, Employee, and Employer are linked by a plurality of algorithms to register and authenticate employees, and process move data, wherein the at least one entity stores commercial office move tracking data; and creating a project communication team for at least one group of employees to communicate on a commercial moving project by selecting a project name or a project number or any other identifier, and date and time of execution as attributes, and generating queries for selecting users from a database, wherein embedding at least one attribute in the queries, generates the project communication team for communicating on the commercial moving project.

17. The method of claim 16 further comprising an algorithm for adding team members to the project communication team, provides a messaging module that generates the project communication team where members of the team are extracted from scheduled employees of a moving company and employees of a client company working on a project, wherein the user or client presses a button link named Add Delete Internal Team Members invoking the algorithm to add or delete team members and add co-workers to the project communication team, wherein pressing the button link named Generate Project Communication Team on an interface, further invokes the algorithm to embedding at least one attribute into a query and submitting the query to the database or file in memory of the server extracting names of employees of a moving company scheduled to work on the project at that time, wherein the two groups merge automatically into a project communication team, and the team communicate by instant messaging and phone.

18. The method of claim 16 further comprising:
the algorithm for controlling moving company employee data entry;
executing an app and authenticating a moving company employee at the origin office ;
utilizing data driven interfaces to generate data entry buttons based on available data pre-entered into the database during prep phase, and the employee selecting desired data entry button links based on user type including pc tech, installer, packer and mover wherein the user of type pc tech entering computer disconnect data about the origin office move and automatically highlighting PC origin office to indicate completion when viewed by other users;
the algorithm displaying multiple selection GUI s when the pc tech computer disconnect data is not pre-entered, and the pc tech entering data by selection menus, recording any issues and saving all the data to the origin entity in memory of the server;
authenticating another pc tech employee at the destination office, the employee selecting data entry button links by mover title and viewing a completed origin office displayed as a confirmation GUI with a highlighted color indicating completion of the origin office;
the employee entering data at the destination office by touch buttons or selection menus instead of typing, and saving the data to the entity Destination automatically highlighting the destination office as complete, wherein the origin and destination office move data is saved to at least one entity in the database on server and viewed in real time on mobile devices or computer interfaces by the moving company employees, moving broker company employees and the client company keeping track of completed offices and the move progress.

19. The method of claim 16 wherein the method further comprising:
launching an app on a mobile device and displaying an interface with a window designated for displaying announcements related to a current or ongoing project and ads from third party sources, wherein the announcements and ads are displayed in form of text, video, audio and links in a mobile phone app linked to the database or file system in the memory of the server.

20. The method of claim 18 wherein the method:
electronically tracking and linking offices moved to employees that move the offices, and office owners utilizing data driven interfaces and preventing data entry errors, wherein the data driven interfaces interacts with the database in memory of the server through algorithms; and
generating buttons including phone number buttons on the interfaces, wherein reading phone numbers of team members from the database or file and embedding the phone numbers in buttons, and wherein displaying the buttons as call buttons against names without displaying actual phone numbers, wherein team members are tracked by calling the phone button links and wherein the phone button links are indicated by user type as packers, pc techs, installers, movers, supervisors and clients.

* * * * *